United States Patent [19]
Dysarz

[11] Patent Number: 5,071,662
[45] Date of Patent: Dec. 10, 1991

[54] POPPED CORN ONLY CORN POPPER

[76] Inventor: Edward D. Dysarz, 11423 Triola La., Houston, Tex. 77072

[21] Appl. No.: 378,157

[22] Filed: Jul. 11, 1989

Related U.S. Application Data

[63] Continuation-in-part of Ser. No. 255,867, Oct. 11, 1988, Pat. No. 4,902,520.

[51] Int. Cl.⁵ .............................................. A23L 1/18
[52] U.S. Cl. .................................. 426/106; 99/323.5; 99/323.8; 99/323.9; 99/323.11; 426/112; 426/113; 426/115
[58] Field of Search ................. 99/323.4, 323.5, 323.8, 99/323.9, 323.11; 426/106, 107, 112, 113, 115

[56] References Cited
U.S. PATENT DOCUMENTS

| | | | |
|---|---|---|---|
| 1,839,671 | 1/1932 | Hale | 99/323.11 |
| 3,280,720 | 10/1966 | Kuhn | 99/323.9 |
| 4,072,091 | 2/1978 | Richardson | 99/323.5 |
| 4,512,247 | 4/1985 | Friedman | 99/323.5 |

Primary Examiner—Donald E. Czaja
Assistant Examiner—D. Workman
Attorney, Agent, or Firm—Derek R. Van Gilder

[57] ABSTRACT

A device and method to pop corn while preventing any unpopped kernels from mixing with the popped corn and further preventing the already popped corn from burning. Each corn kernel is placed into an individual cell on a cassette. When the kernel is popped, it pops out of the cell and falls off of the cassette and is thus removed from the heat source. The unpopped kernels remain in the cassette where they will later be disposed of.

21 Claims, 24 Drawing Sheets

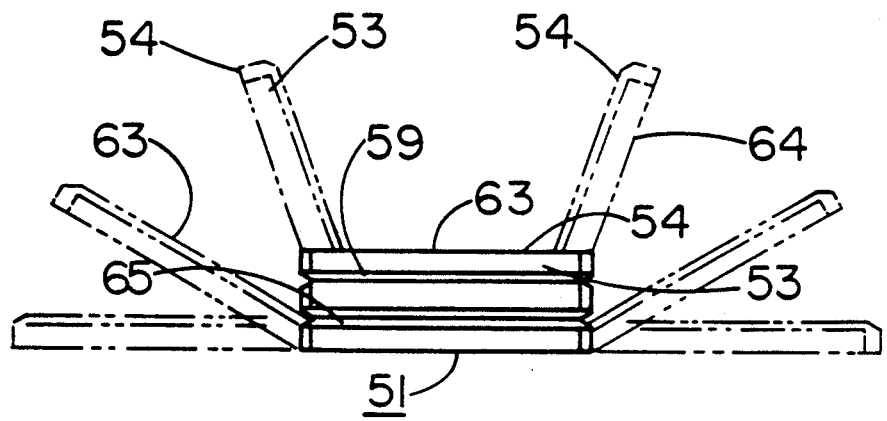
FIGURE 23
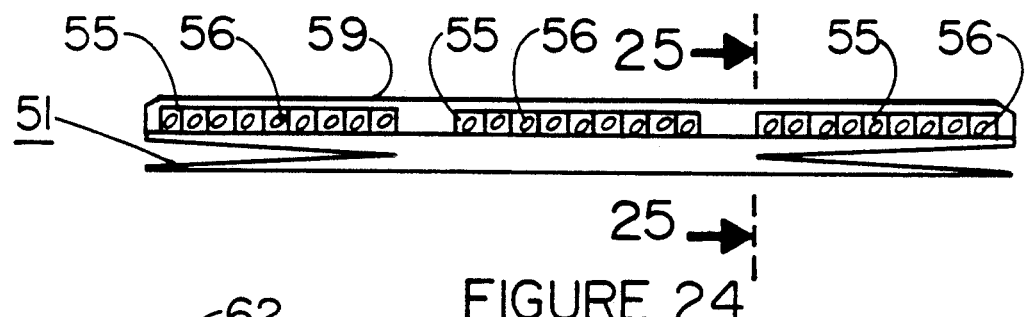
FIGURE 24
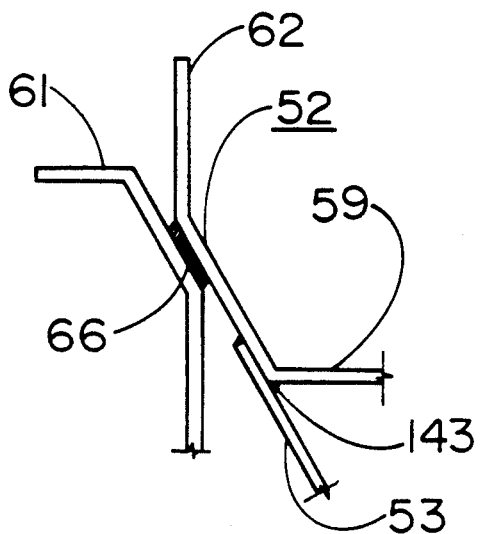
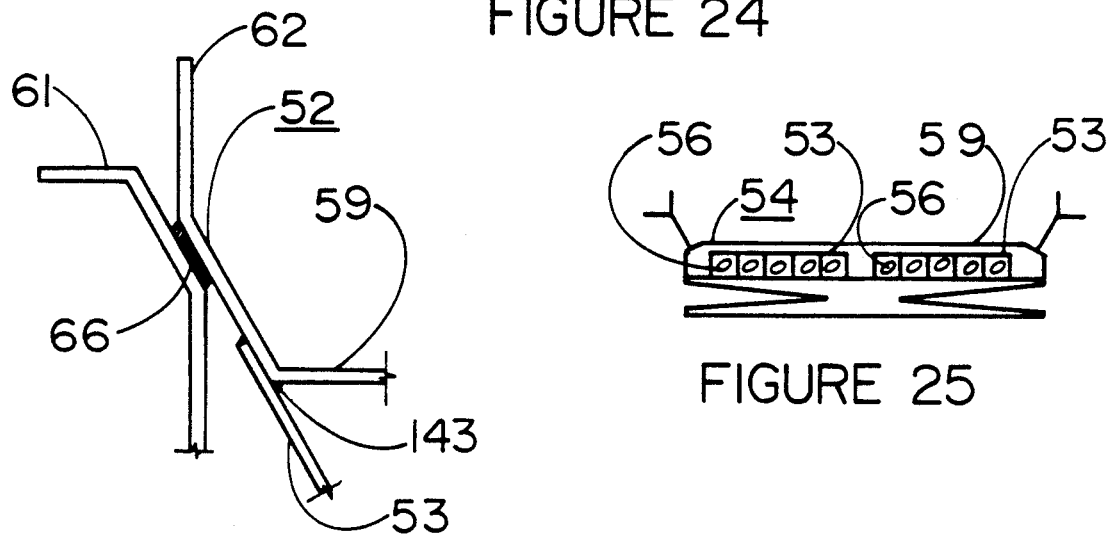
FIGURE 25
FIGURE 26

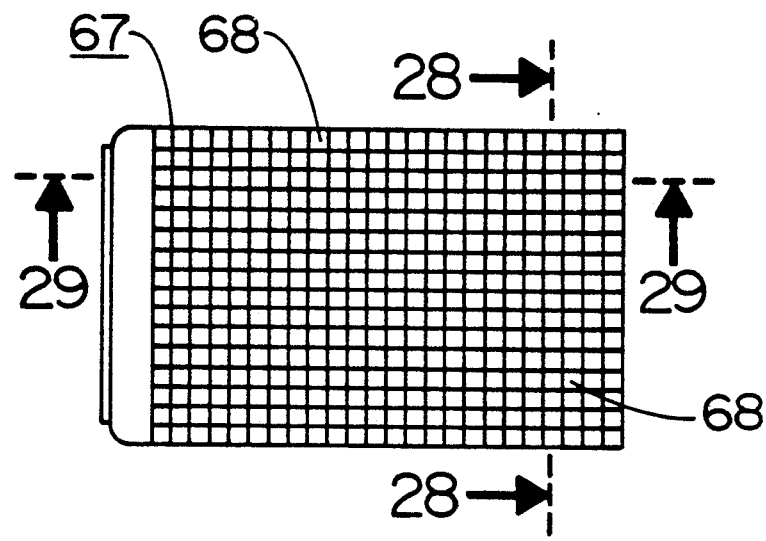
FIGURE 27
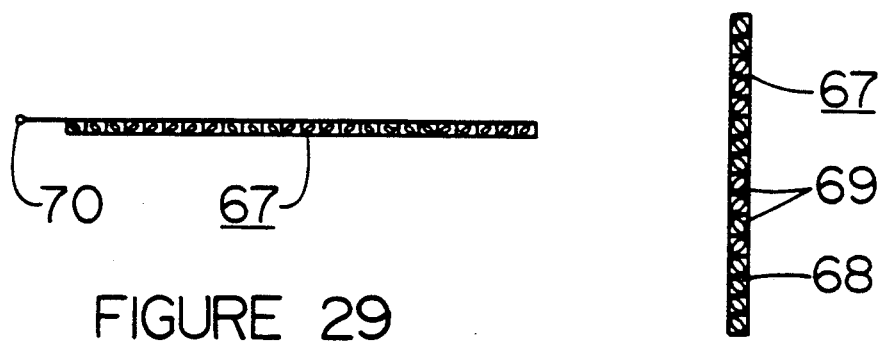
FIGURE 29
FIGURE 28
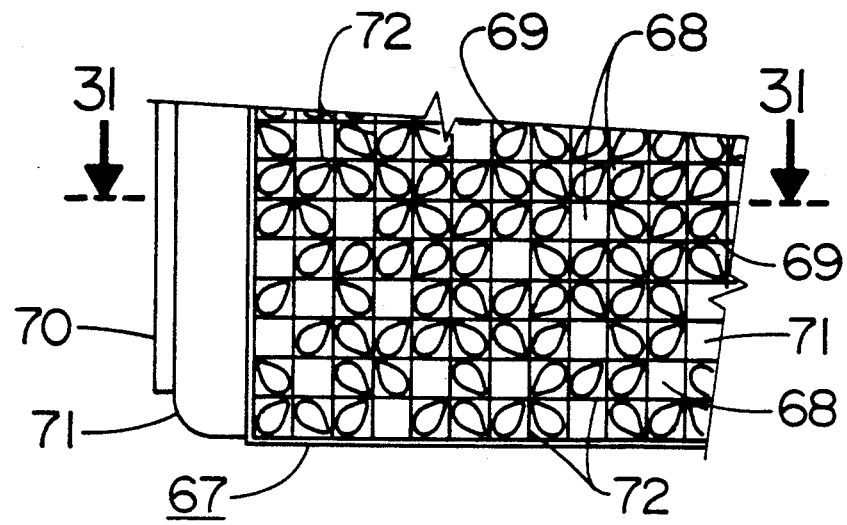
FIGURE 30

POPPED CORN ONLY CORN POPPER

Cross reference to related applications continuation in part of U.S. patent application Ser. No. 07/255,867 filed 10/11/88 now U.S. Pat. No. 4,902,520 of Edward D. Dysarz which is incorporated and by reference.

1. FIELD OF THE INVENTION

The present invention relates to popping corn. The present invention has been found to be particularly useful in popping corn while preventing the unpopped kernels from mixing with the popped kernels. The present invention has also been found to be particularly useful in popping corn while preventing the already popped corn from burning.

2. DESCRIPTION OF THE PRIOR ART

Popped corn is generally eaten as a snack food. Most households have a device that will pop corn. Popped corn is eaten and enjoyed as a snack food in most countries of the world.

There exists various methods of popping corn today. One of the earliest methods of popping corn is placing the corn kernels into a pot or pan with some oil, placing the pot or pan over a source of heat, heating the oil to a proper temperature that causes the corn kernels to pop. The problem with this method of popping corn is that the popped corn lays in the bottom of the pot or pan and burns or scorches and also absorbs the oil on the bottom of the pot or pan. Another earlier method of popping corn is to place the corn kernels into a container made of wire mesh and to hold the corn over an open fire. The heat will pop the corn, but it also easily burns the popped corn.

Still another method of popping corn is the air method. With this method, hot air is blown onto the unpopped kernels, causing the kernels to pop. When the kernels pop, the hot air blows the popped corn into a chute where it falls into a bowl or other container.

There are several problems with this method of popping corn. 1) It cannot be used in a microwave oven. 2) The unpopped kernels (those kernels that will not pop) tend to clog up the chute and air vent of the air popper. 3) Cooking oil is not used to pop the corn; even though butter may be added, the corn still has a flat taste. 4) The air popper takes a long time to pop the corn and it requires more energy to pop the corn.

Another method of popping corn is the use of a microwave oven. The corn kernels with cooking oil and perhaps flavoring are placed in a non-metalic bag that expands as the corn is popped. There are various methods of adding a charge to expand the bag as the corn is being popped, but in most cases a charge of steam from the popped corn will expand the bag.

Several types of expanding bags for popping corn have been known and used before and typical examples thereof are shown in U.S. Pat. No. 2,865,768 issued to BARNES; U.S. Pat. No. 2,741,559 issued to BANOWITZ; U.S. Pat. No. 2,673,806 issued to COLMAN; U.S. Pat. No. 3,052,554 issued to COLMAN; U.S. Pat. No. 3,835,280 issued to GADES; U.S. Pat. No. 3,973,045 issued to BRANDBERG; U.S. Pat. No. 4,036,423 issued to GORDON; U.S. Pat. No. 4,038,425 issued to BRANDBERG; U.S. Pat. No. 4,292,332 issued to MCHAM; U.S. Pat. No. 4,548,826 issued to WATKINS.

Although all of the devices will pop corn, and the devices from Gades and Watkins are for popping corn in a microwave oven, they all have several problems. The first problem is that the unpopped kernels will mix with the popped corn and will require care while eating to prevent biting down on an unpopped kernel. The second problem is that when there is about twenty-five percent of unpopped corn, there remains an excess of salt and other flavoring which makes the popped corn oily or salty. The third problem is that while attempting to pop the unpopped kernels, the popped kernels which are rather delicate, get burned easily.

When using a microwave oven, the problem of burning the corn is more acute. With a microwave oven, the microwaves or energy waves come from the top of the oven and therefore must heat the corn kernels from above. When more then half of the corn kernels are popped, they cover up the unpopped kernels and therefore the microwave energy must go through the popped corn first and, therefore, will be absorbed in the popped corn before it reaches the unpopped kernels. This causes the popped corn to absorb most of the energy and scorch while the unpopped kernels do not get sufficient energy to be popped.

SUMMARY OF THE INVENTION

The present invention is a highly efficient device that will pop corn while preventing unpopped kernels from mixing with the popped corn. The present invention will prevent or resist the popped corn from burning and scorching while directing more heat or microwave energy into the unpopped corn kernels.

The method of popping corn of the preferred embodiment is for popping corn in a microwave oven wherein the unpopped corn kernels are held in place at the top of the container and are exposed to the more intense microwaves and further reduce the effect of the microwaves on the already popped corn by absorbing the microwaves or energy before it can go into the already popped corn, thus preventing the already popped corn from burning and further causing the unpopped corn to absorb more energy and pop sooner.

Other embodiments of the present invention will allow the present invention to be used for popping corn with a conventional heating method while still preventing the unpopped kernels from mixing with the popped corn and from further burning or scorching the popped corn.

BRIEF DESCRIPTION OF THE DRAWINGS

For further understanding of the nature and objects of the present invention, reference should be had to the following detailed description of the preferred embodiment and other embodiments thereof taken in conjunction with the accompanying drawings, in which parts are given like numerals and wherein:

FIG. 23 is an elevation of the package of corn kernels describing how the package will be opened.

FIG. 24 is an elevation of the package of corn kernels in an unfolded position.

FIG. 25 is a side elevation of the package of corn kernels in an open position as taken through FIG. 24.

FIG. 26 is an enlarged section elevation of the upper corners of the package as taken from FIG. 22.

FIG. 27 is a plan view of another popcorn cassette of another embodiment.

FIG. 28 is a section elevation as taken through FIG. 27.

FIG. 29 is still another section elevation as taken through FIG. 27.

FIG. 30 is an enlarged plan view of a part of FIG. 27.

FIG. 51b is a section elevation as taken through FIG. 51a.

DETAILED DESCRIPTION OF THE PREFERRED EMBODIMENTS

The embodiments of the device and the method of the present invention may be used to pop corn while preventing the already popped corn from burning or scorching.

The superior ability to pop corn is accomplished by placing each corn kernel into its own popping chamber and popping each corn kernel as a single unit.

Another object of the invention is to prevent the unpopped corn kernels from mixing with the already popped corn kernel.

Still another object of the invention is to place the unpopped kernels closer to the source of heat or energy, thus reducing the energy required to pop corn.

Yet another object of the invention is to pop a greater number of kernels by placing said kernels closer to the heat source.

Yet another object of the invention is to pop corn in a microwave oven into a bowl.

Yet another object of the invention is to pop corn in a microwave oven without an excess of oil, salt or flavoring in the popped corn.

Yet another object of the invention is to keep a precise ratio of oil, salt and flavoring in the popped corn.

DEVICE AND ITS METHOD OF USE

Figure 1:
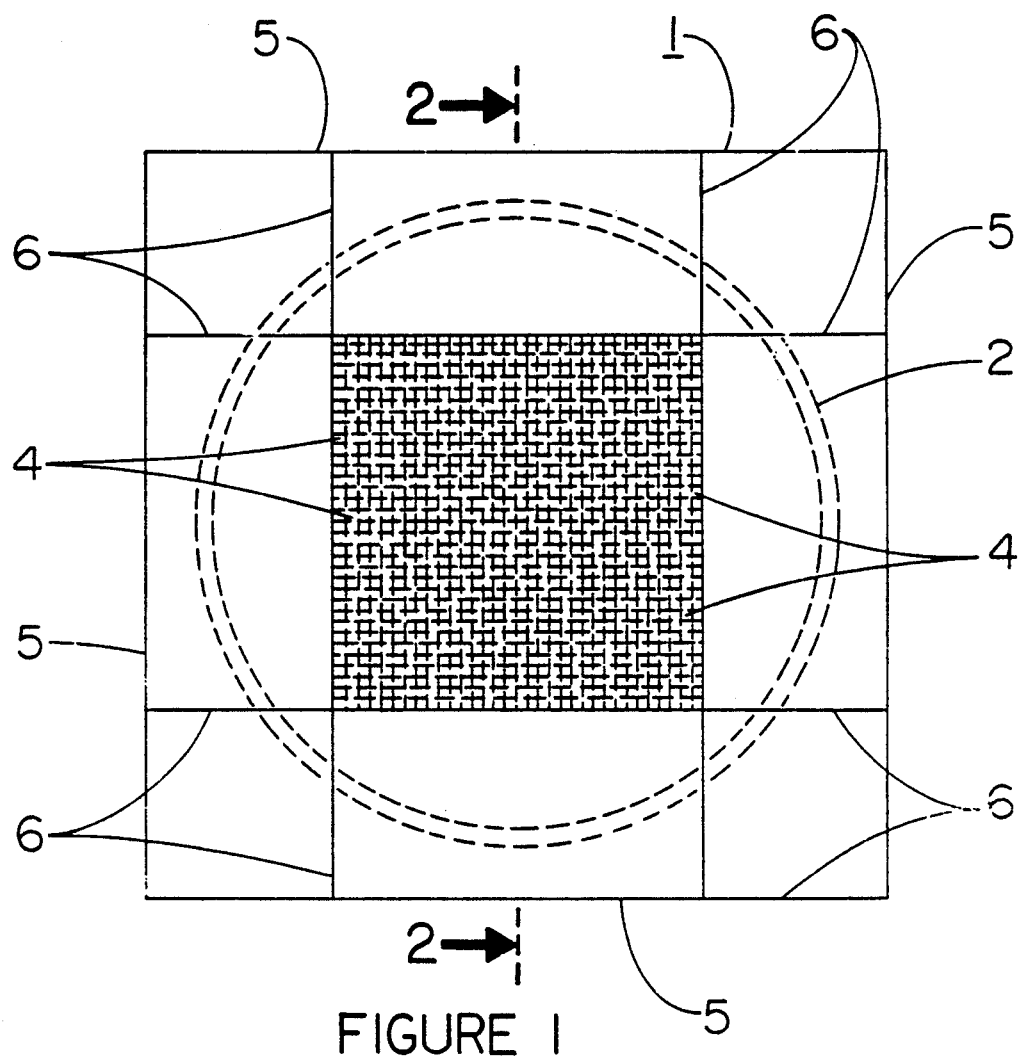
FIG. 1 is a plan view of the preferred embodiment showing the device on a bowl.

Referring to FIG. 1, there is shown a plan view of a popcorn sheet 1 setting on the top of a bowl 2 or suitable container. A popcorn panel 3 is suitably fixed to the underside of the popcorn sheet 1. The popcorn panel 3 is comprised of the popcorn kernel chambers 4. The popcorn panel 3 is supported over the bowl 2 by the support panels 5 that rest on the upper lip of the bowl 2 or suitable container and are part of the popcorn sheet 1.

The support panels 5 are shown with fold lines 6, which is where the support panels 5 are folded when the popcorn sheet 1 is in a package on a store shelf. The popcorn sheet 1 is set on top of a bowl 2 and placed into a microwave oven where it is exposed to the microwaves.

Figure 2:
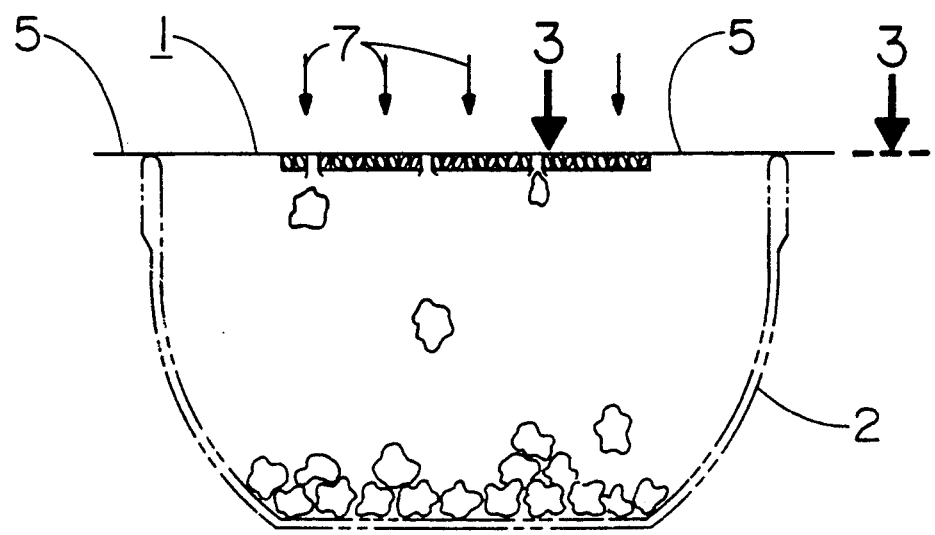
FIG. 2 is a section elevation of the preferred embodiment taken through FIG. 1 showing the device in use.

Referring to FIG. 2, there is shown a section elevation as taken through FIG. 1. The popcorn sheet 1 is supported on the bowl 2 by the support panels 5.

The unpopped corn kernels 8 are held in the popcorn kernel chambers 4 and by the chamber walls 9, the cover panel 10 and the burst panel 11. The popcorn panel 3 is part of the cover sheet 1.

The microwaves 7 penetrate the popcorn panel 3 and heat up the corn kernels 8. When the corn kernels 8 are sufficiently heated, they pop into popped corn 12. When the corn kernels 8 pop, they burst through the burst panel 11 and fall into the bowl 2.

The support panel 5 will also defuse the microwaves 7 to some extent, and thus will prevent the microwaves from burning the popped corn 12. The distance from the source of the microwaves 7 and the popped corn 12 is greater than the distance from the source of the microwaves 7 and the corn kernels 8 and therefore the ability of the microwaves 7 to burn the popped corn 12 is substantially lessened.

Figure 3:
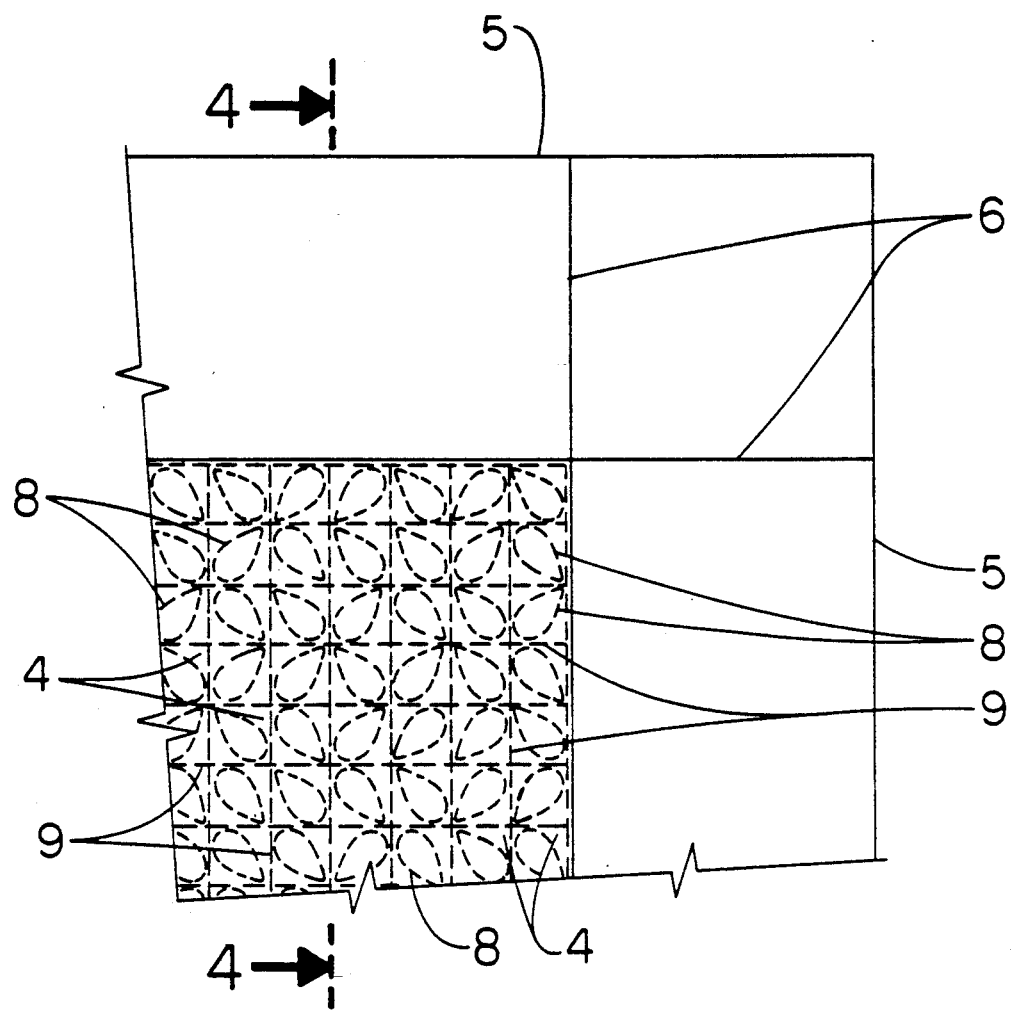
FIG. 3 is an enlarged view taken from FIG. 2.

Referring to FIG. 3, there is shown an enlarged view taken from FIG. 2.

The corn kernels 8 are shown held in place by the chamber walls 9 that make up the popcorn kernel chambers 4 and covered by the popcorn panel 3. The support panels 5 are shown along with the fold lines 6.

Figure 4:
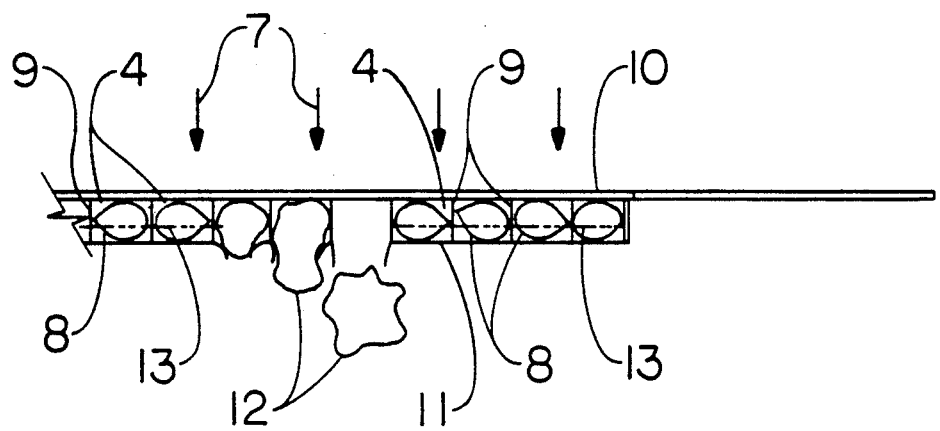
FIG. 4 is an enlarged section elevation taken through FIG. 3 showing the corn kernels popping.

Referring to FIG. 4, there is shown an enlarged section elevation as taken through FIG. 3 further defining how the corn kernels 8 are held in place and popped.

The corn kernels 8 are shown held in place in the popcorn kernel chamber 4 that is composed of the popcorn panel 3, the burst panel 11 and the chamber walls 9. As the microwaves 7 penetrate the popcorn panel 3, and heat the corn kernels 8, the steam builds up within the corn kernels 8 which causes them to explode or pop open, when this occurs the popped corn 12 will burst through the burst panel 11, tearing the burst panel 11 as it bursts through the burst panel 11. The popped corn 12 will fall into the bowl not shown or some other suitable container not shown.

There is also shown a suitable amount of suitable oil 13, salt or flavoring within the popcorn kernel chamber 4. When the corn kernels 8 pop into popped corn 12 only that amount of oil 13, salt and flavoring is released that is contained in the popcorn kernel chamber 4 and no more or no less; this will assure a constant amount of oil, salt and flavoring per unit of popped corn. This will also assure that there will not be any excess salt, oil 13 or flavoring at the bottom of the bowl. Where a corn kernel 8 does not pop, that salt, oil or flavoring will not be released into the bowl, thereby assuring that the popped corn 12 will not be too salty, too oily or over flavored.

The burst panel 11 is made of suitable paper or plastic or other suitable material that will not leak under heated conditions and yet it will be sufficiently brittle to allow the popped corn 12 to break through and fall out. The popcorn panel 3 and the chamber walls 9 are sufficiently strong not to break down when the corn is popped. The burst panel 11 must also be of a suitable material that will prevent the oil 12 from bleeding through or penetrating the burst panel 11.

Figure 5:
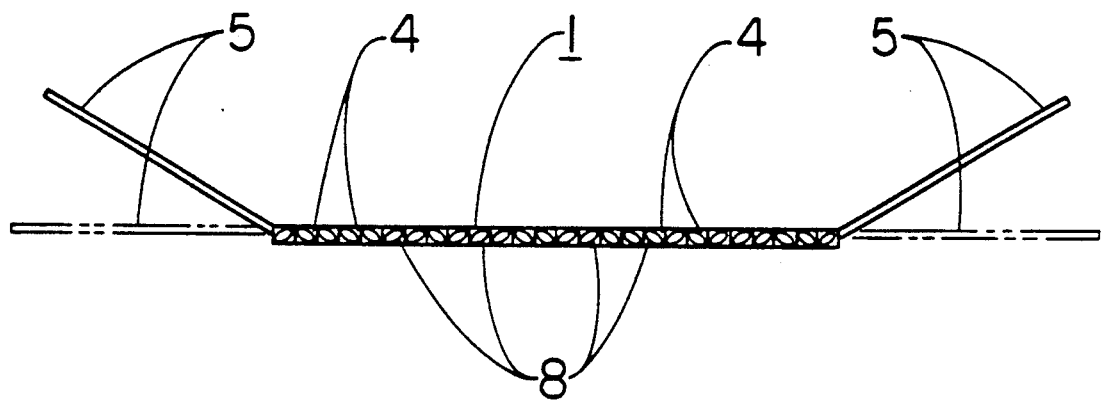
FIG. 5 is a section elevation showing the device being folded or unfolded.

Referring to FIG. 5, there is shown a section elevation of the popcorn sheet 1 as it is being folded or unfolded. The support panels 5 are shown in the open position as pantom lines and the closing or opening position is shown in solid lines. The corn kernels 8 are shown contained in the popcorn kernel chambers 4.

Figure 6:
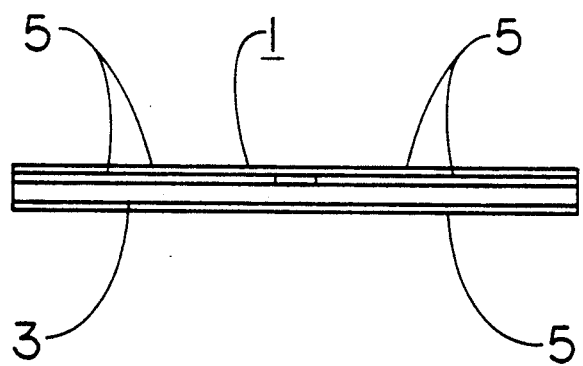
FIG. 6 is a section elevation of the folded device of the preferred embodiment.

Referring to FIG. 6 there is shown an elevation of the popcorn sheet 1 in a completely folded condition as it would be in a wrapper on a store shelf. The support panels 3 are shown folded over one another.

Figure 7:
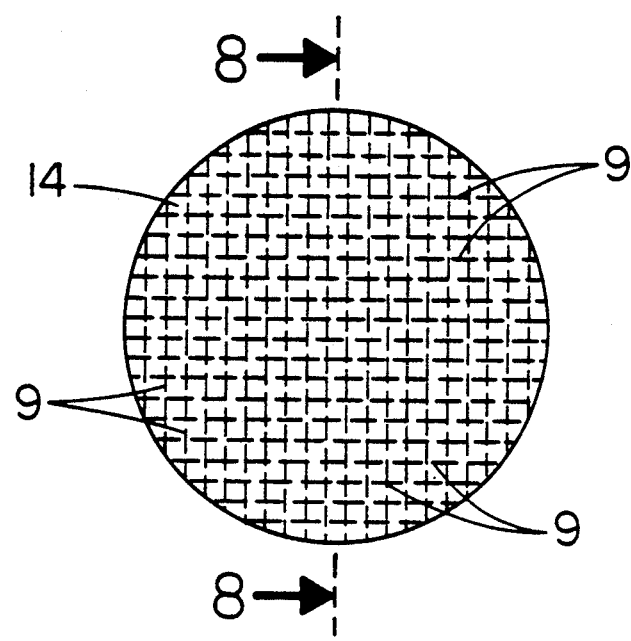
FIG. 7 is a plan view of a round configuration of the preferred embodiment.

Referring to FIG. 7, there is shown a plan view of another configuration of the preferred embodiment.

The popcorn panel 14 is round, but it could be square, rectangular, triangular, or any other configuration. The popcorn panel 14 is shown with chamber walls 9 as hidden lines.

Figure 8:
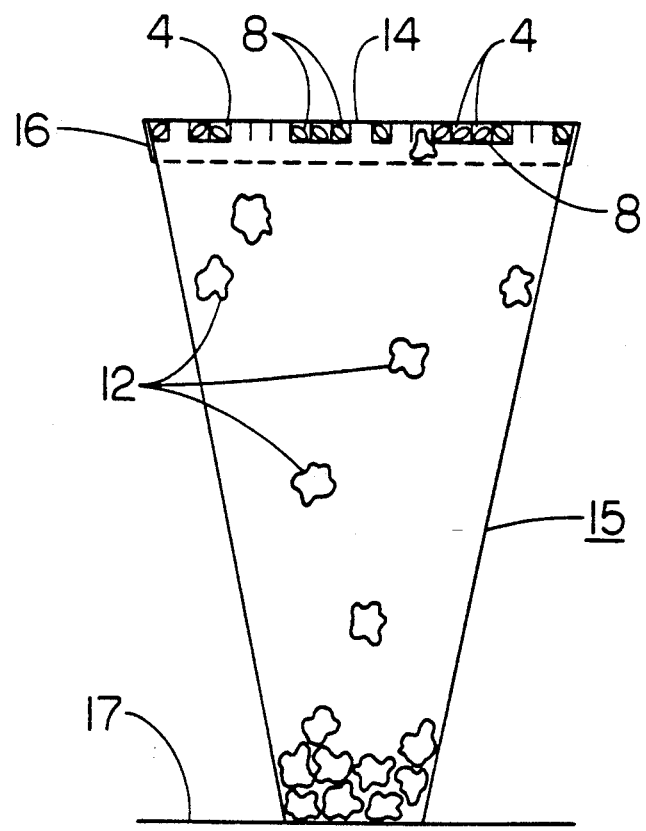
FIG. 8 is a section elevation as taken through FIG. 7.

Referring to FIG. 8, there is shown a section elevation as taken through FIG. 7.

The popcorn panel 14 is shown at the top of the container 15. The corn kernels 8 are shown being held in the popcorn kernel chambers 4 which makes up the popcorn panel 14. There is also popped corn 12 as it falls from the popcorn panel 14 into the container 15.

The popcorn panel 14 is shown suitably fastened to the container 15 by tape 16 that goes around the entire circumference of the popcorn panel 14 and the container 15 to make an airtight seal. When the corn is popped and the container 15 is full of popped corn 12, the tape 16 is removed and the popcorn panel 14 is thrown away.

Figure 9:
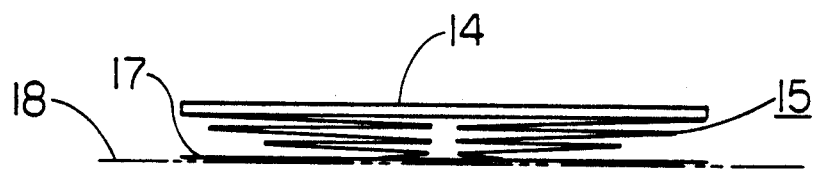
FIG. 9 is an elevation of the device of FIG. 7 showing it in a compressed condition before energy is applied.

The container 15 is expanded from a folded position as will be shown in FIG. 9 by means of a gas charge or a charge of steam from the popped corn 12. At the bottom of the container 15 is a stand 17 that will balance the container 15 as the popped corn 12 is popped and the container 15 expands.

Referring to FIG. 9, there is shown an outside elevation of the container 15 in a compressed condition. This would be similar to the configuration of the container 15 when it is in a package on the store shelf 18 or some other suitable storage location. It could even be compressed more to take up less space.

The container 15 itself is shown compressed between the stand 17 and the popcorn panel 14. The stand 17 is further shown setting on a shelf 18.

Figure 10:
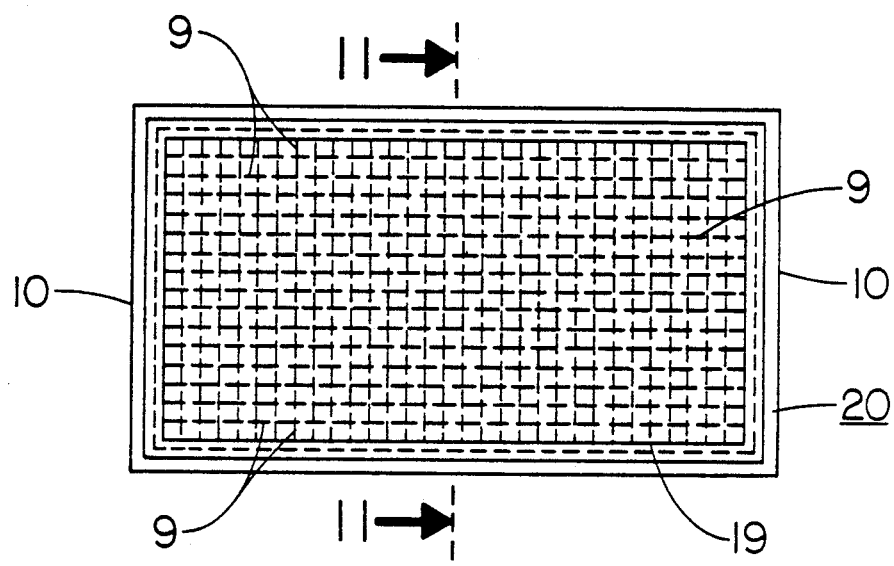
FIG. 10 is still another configuration of the device of the preferred embodiment.

Referring to FIG. 10, there is shown an elevation of still another configuration of the preferred embodiment.

The popcorn panel 19 is shown in a rectangular configuration with the chamber walls 9 as hidden lines. The popcorn panel 19 forms part of the container 20. The container 20 also has side walls 10 that are triangular in shape not shown in this view.

Figure 11:
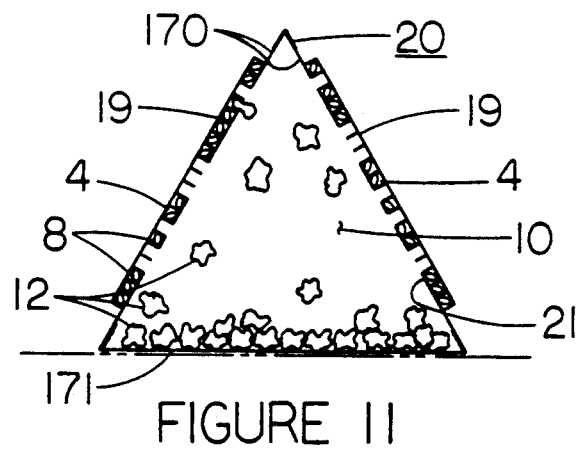
FIG. 11 is a section elevation as taken through FIG. 10.

Referring to FIG. 11, there is shown a section elevation as taken through FIG. 10.

There is a popcorn panel 19 shown with three legs forming a triangular shaped container 20. The side legs 170 have the popcorn panels 19, while the base leg 171 is the base and part of the container 20. The popcorn kernel chambers 4 are suitably fixed to the popcorn panel 19 in the same manner as the two other embodiments. As the corn kernels 8 pop into popped corn 12, they burst through the burst panel 21 and are held by the container 20. The popped corn 12 is held inside of the container 20 by side legs 170, the base leg 171, and the side walls 10. The side walls are on each side of the container 20.

Figure 12:
FIG. 12 is a section elevation of the device of FIGS. 10 and 11 showing the device in a folded package condition.

Referring to FIG. 12, there is shown a section elevation of the triangular shaped container 20 in a folded position as it would appear on a grocery store shelf 18; it would be wrapped in a suitable package.

Figure 13:
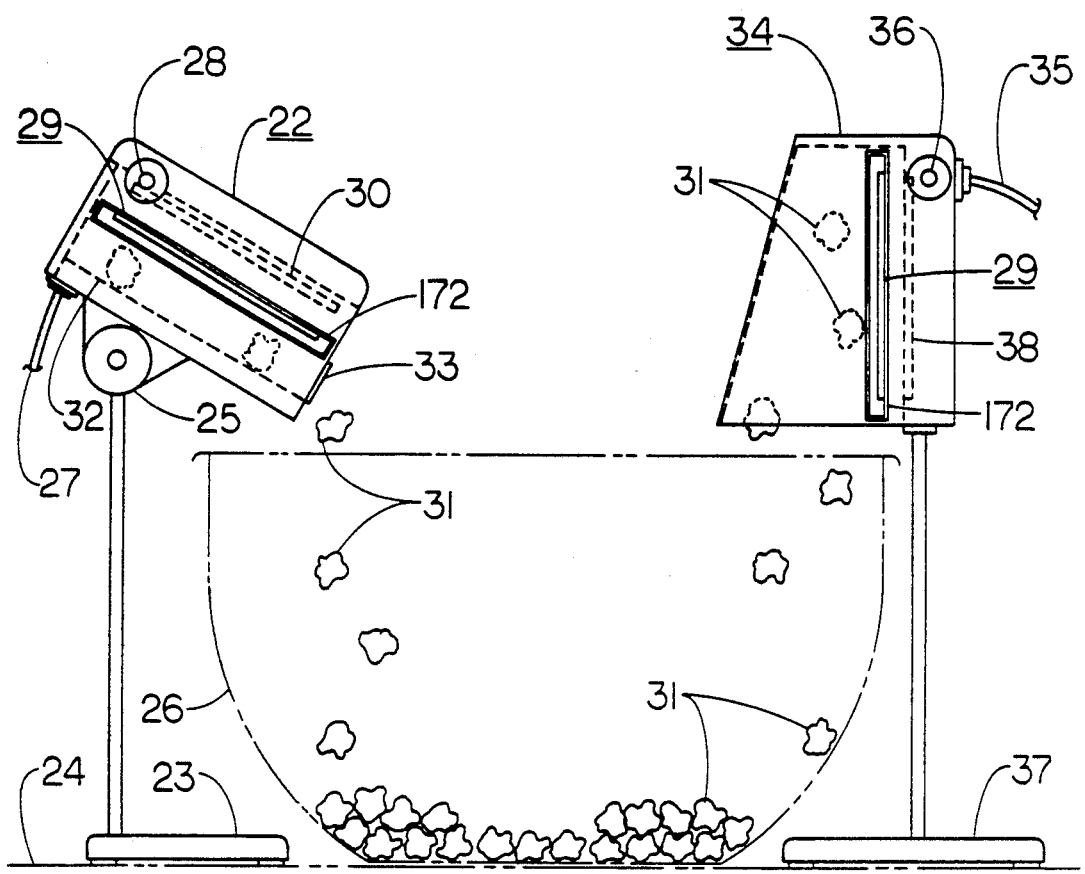
FIG. 13 is an elevation showing the device as it would be used with a conventional heating element.

Referring to FIG. 13, there is shown an elevation of still another configuration of the preferred embodiment.

The devices that were described in FIGS. 1 through 12 are designed to operate in a microwave oven; the devices that will be shown in FIGS. 13 through FIG. 25 are for induction heat means.

In FIG. 13, there are two configurations of the same type of popcorn poppers.

The sloping popper 22 is a block shape oven with a hollow inside. The sloping popper on the left side is shown on a stand 23. The stand 23 is setting on a counter top 24 or another suitable surface. The stand 23 is connected to sloping popper 22 by a suitable adjustable pivot mount 25 that is common in the industry. The adjustable pivot mount 25 will allow the angle on the sloping popper 22 to be adjustable to suit a particular bowl 26.

The sloping popper 22 has a suitable electric power line 27 connected to it for power; this could also be a suitable gas line if necessary. An electric switch 28 for on and off or heat selection is located near the top of the sloping popper 22. A corn cassette 29 is shown inserted into a cassette slot 172 in the side of the sloping popper 22 where a heating element 30 will heat up the corn kernels not shown in this view causing the corn kernels to pop into popped corn 31. The popped corn 31 will pop out of the corn cassette 29, onto the sloping floor 32 of the sloping popper 22 where it will further fall out of the mouth 33 of the sloping popper 22 and into the bowl 26 or some other suitable container.

The vertical popper 34 on the right side of FIG. 13 is a block shaped oven with an inside and an outside similar to the sloping popper 22, only the corn cassette slot 172 and the cassette 29 are in a vertical position. The vertical popper 34 has connected to it an electric power line 35, an on and off switch 36 a stand 37 and a heating element 38.

The corn cassette 29 is inserted into a cassette slot 172 in the side of the vertical popper 34 in a vertical position. The heating element 38 is turned on and heated. The heat causes the corn kernels to pop into popped corn 31 which falls into the bowl 26.

Figure 14:
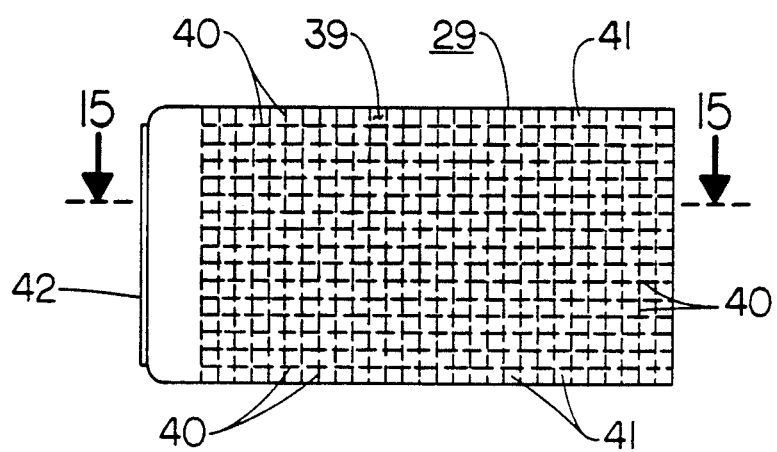
FIG. 14 is a plan view of the popcorn cassette.

Referring to FIG. 14, there is a plan view of the corn cassette 29.

The corn cassette 29 is composed of a cover panel 39 that is made of plastic, metal or some other suitable material that will conduct heat or allow heat to pass through it but will not break up when the corn kernels pop. On the other side of the cover panel are the chamber walls 40 that form the popcorn kernel chambers 41 that will hold the popcorn kernels not shown in this view. The chamber walls 40 are slightly higher than a popcorn kernel. At one end of the corn cassette 29 is the finger grip 42 that will allow a person to grip the corn cassette 29 to put it into the popper or to remove it from the popper.

Figure 15:
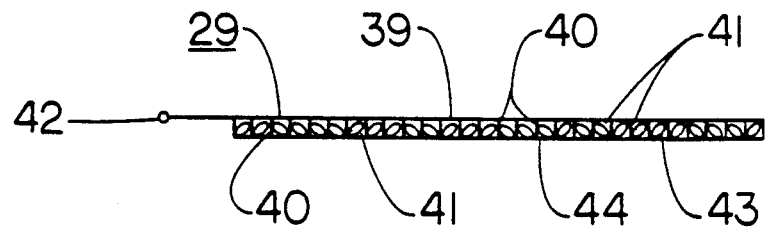
FIG. 15 is a section elevation of the popcorn cassette as taken through FIG. 14.

Referring to FIG. 15, there is shown a section elevation of the corn cassette 29 as taken through FIG. 14.

The cover panel 39 is shown over the corn kernels 43. The chamber walls 40 are shown separating each corn kernel 43 from one another. The combination of the chamber walls 40 and the cover panel 39 form the popcorn kernel chamber 41 which will isolate each corn kernel 43 when it pops or explodes and prevents it from affecting the corn kernels 43 in the adjacent popcorn kernel chambers 41. Below the corn kernels 43 is the burst panel 44. The burst panel 44 will hold the corn kernels 43 in the popcorn kernel chambers 41 before they pop or explode. The burst panel 44 is made out of tissue paper, or wax paper or aluminum foil or some other suitable material that is safe and will tear away when the corn kernels 43 pop or explode forming popped corn as in FIG. 13. The burst panel 44 could also be required to contain popcorn oil, salt and other suitable flavoring for popcorn flavor without breaking down or running through.

Figure 16:
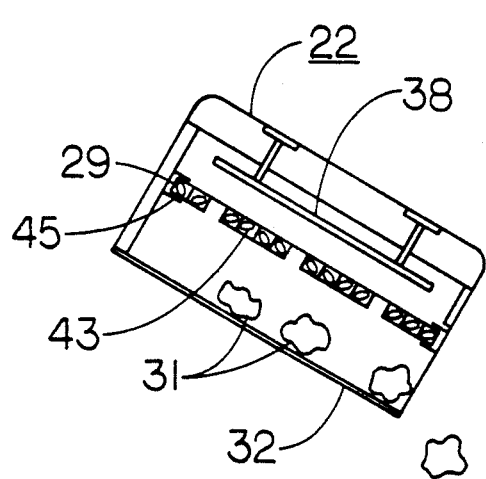
FIG. 16 is a section elevation of a sloping popper as taken through one of the devices of FIG. 13.

Referring to FIG. 16, there is shown a section elevation of the sloping popper 22.

The corn cassette 29 is shown held in place by the cassette guides 45 on each side of the corn cassette 29. Above the corn cassette 29 is the heating element 38 that heats the corn kernels 43. When the corn kernels 43 are sufficiently heated, they pop into popped corn 31. The popped corn 31 will fall into the sloping floor 32 and further slide down the floor 32 and fall out of the sloping popper 22.

Figure 17:
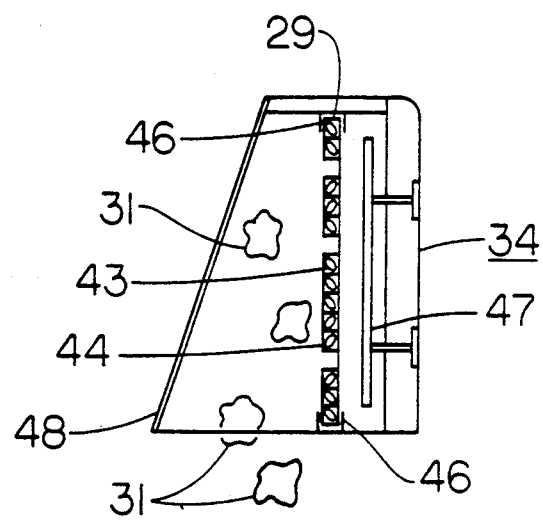
FIG. 17 is a section elevation as taken through the other device of FIG. 13.

FIG. 17 is a section elevation of the vertical popper 34.

The vertical popper 34 is block shaped with an oven-like inside in which the corn cassette 29 is slid into the cassette guides 46 in a vertical position. The heating element 47 heats up the corn kernels 43 until they pop. When the corn kernels pop into popped corn 31 they burst through the burst panel 44 and bounce off of the retainer wall 48 and further fall out of the vertical popper 34.

Figure 18:
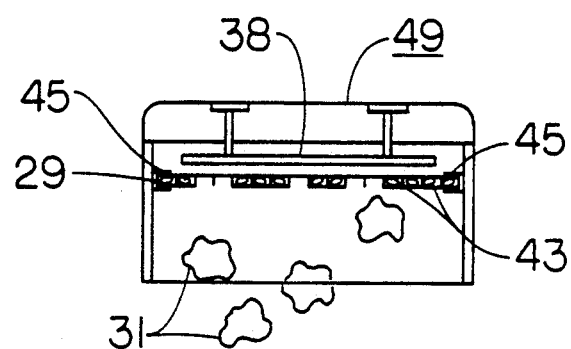
FIG. 18 is a section elevation of still another configuration of a popcorn popper similar to FIGS. 16 and 17.

Referring to FIG. 18 there is shown a section elevation of a horizontal popper 49.

The horizontal popper 49 is a block shaped with an oven-like inside.

The corn cassette 29 is inserted in the side of the horizontal popper 49 in the same manner as the two poppers in FIG. 13. The corn cassette 29 is held in place by the cassette guides 45. The corn kernels 43 are heated by the heating element 38 until they burst into popped corn 31. The popped corn 31 will fall down into any suitable bowl or container.

Figure 19:
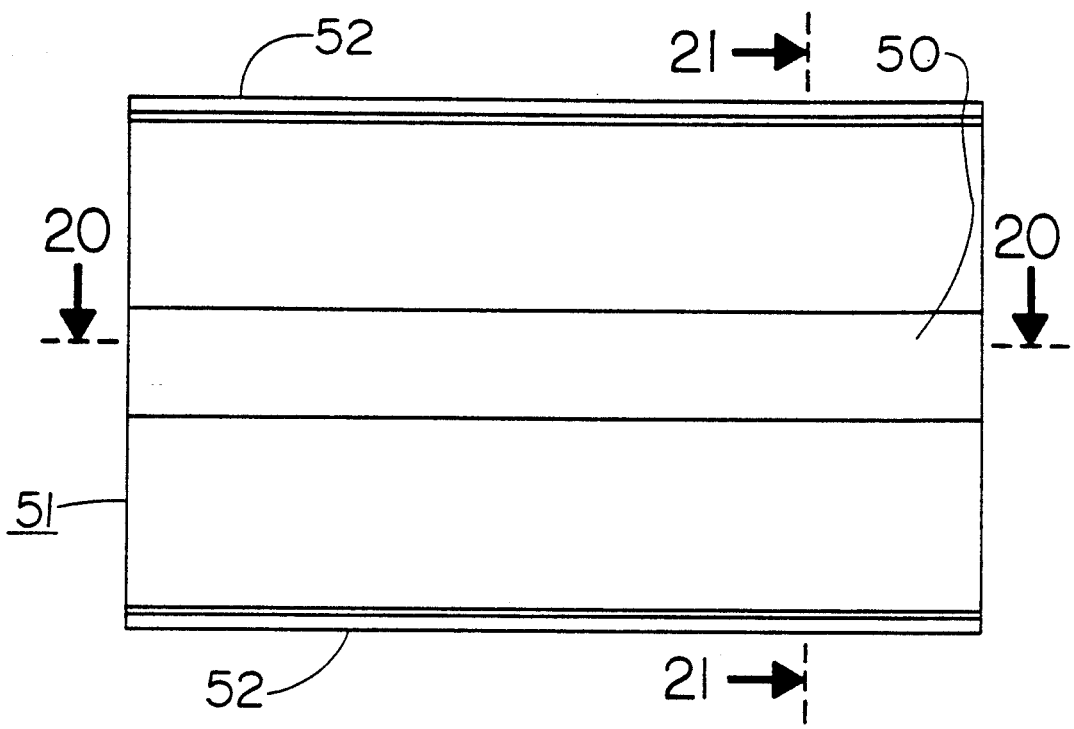
FIG. 19 is a plan view of another embodiment of a popcorn popping device.

Referring to FIG. 19, there is shown a plan view of still another embodiment of a popcorn popping system. The container 51 shown in the plan view is already open and expanded.

On the top is a microwave inhabiter 50 that will prevent microwaves from reaching and burning the popped corn. On each side of the container 51 are the pull open tabs 52.

Figure 20:
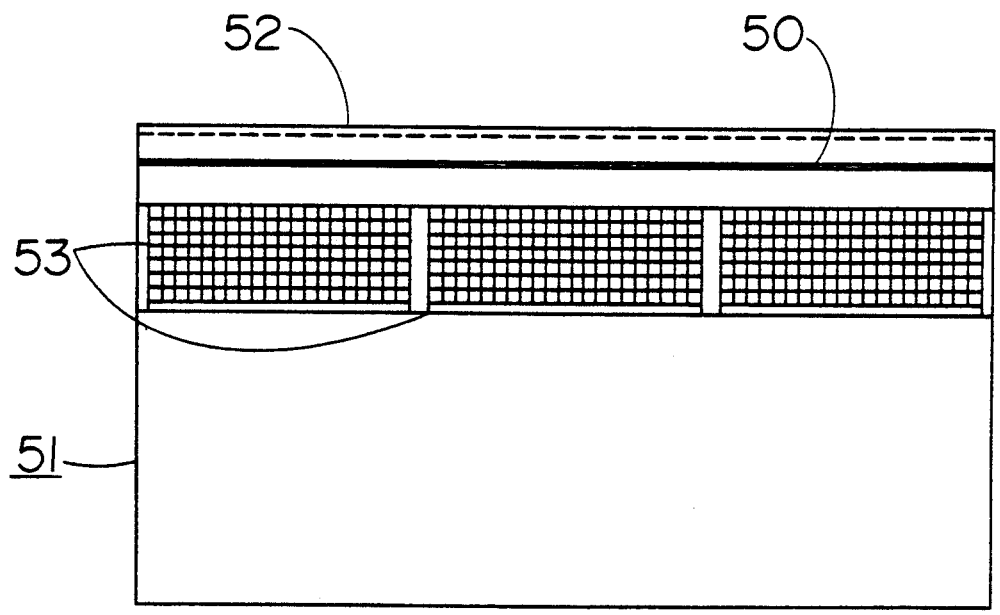
FIG. 20 is a section elevation as taken through FIG. 19.

Referring to FIG. 20, there is shown a section elevation as taken through FIG. 19.

The pull open tab 52 is shown at the top of the container 51. Also shown is the microwave inhabiter 50 that will reduce or eliminate the microwaves in a certain area. The corn kernels are contained in the sectioned tray 53.

Figure 21:
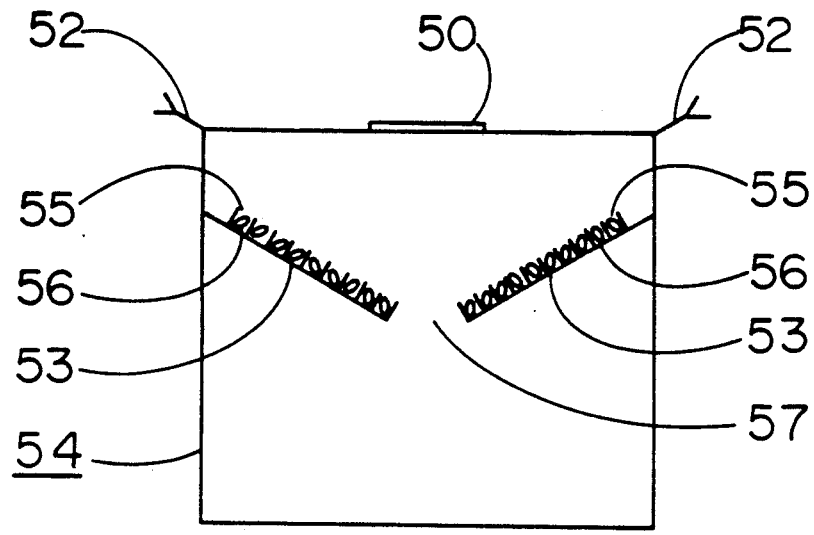
FIG. 21 is a section elevation as taken through FIG. 19.

Referring to FIG. 21, there is shown another section elevation as taken through FIG. 19 of an open chamber popper 54. The corn kernel chambers 55 are open because the corn kernels 56 are held in place by gravity when the corn is being popped and therefore a paper, plastic or foil cover is not necessary to contain or hold the corn kernels 56.

The microwave inhabiter 50 is shown located over the gap 57 between the sectioned trays 53. The pull open tabs 52 are shown at the top of each side of the container 51.

Figure 22:
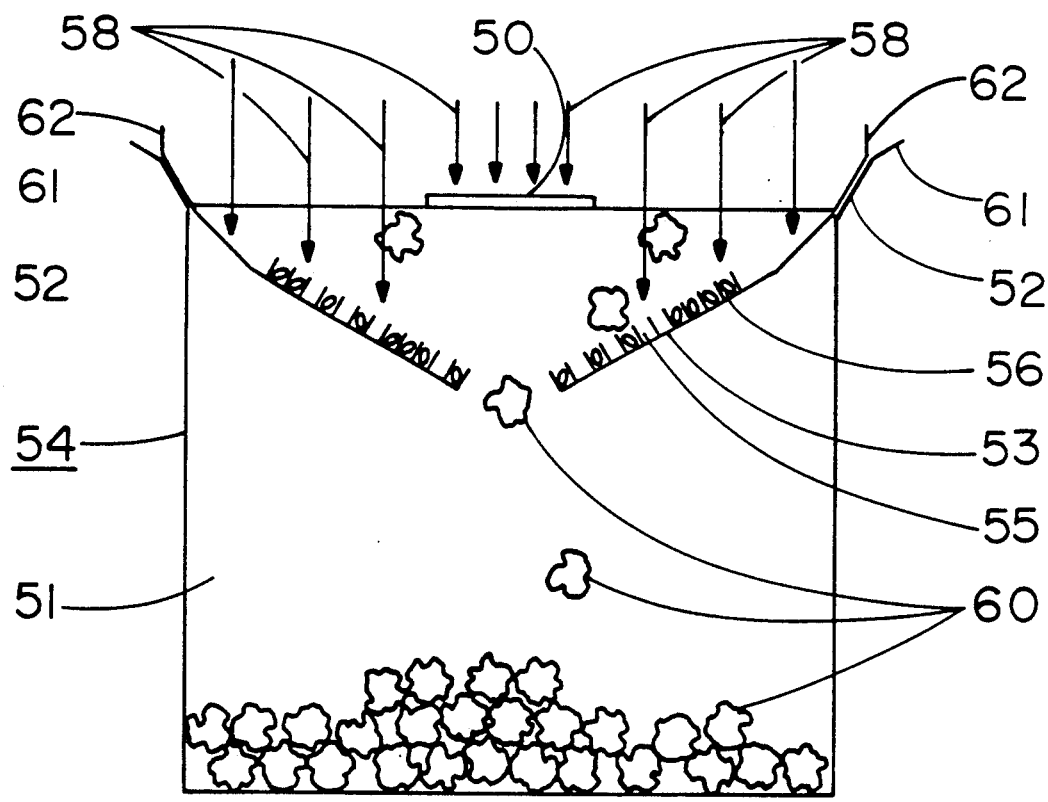
FIG. 22 is an enlarged section elevation similar to FIG. 21, taken through FIG. 19.

Referring to FIG. 22, there is shown an enlarged section elevation of open chamber popper 54.

The microwaves 58 are shown penetrating the cover panel 59 of the open chamber popper 54, but the microwaves 58 are stopped at the microwave inhabiter 50 and the sectioned trays 53. When the corn kernels 56 pop into popped corn 60, they pop out of the corn kernel chambers 55; the popped corn 60 rolls down the sloping sectioned trays 53 and falls through the gap 57 and into the container 51. The microwave inhabiter 50 and the sectioned trays 53, prevent the popped corn 60 from burning and yet concentrate the microwaves 58 on the corn kernels 56 which are also elevated to a height closer to the source of the microwaves 58. The corn kernels 56 can be placed into the corn kernel chambers 55 with the desired amounts of cooking oil, salt or other suitable flavoring.

To open the container 51, the horizontal tab 61 of the pull open tab 52 is grasped with one hand and the vertical tab 62 of the pull open tab 52 with the other hand and the two tabs 61 and 62 are pulled apart. The adhesive holding the two tabs together is made of a suitable material that will not burn or break down under heat, but will unstick or allow the tabs 61 and 62 to be pulled apart. When the tabs are pulled apart, the heat rushing out will not touch the fingers or thumbs of the person opening the container. The cover panel 59 and the sectioned trays 53 will just be disposed of, leaving a container 51 of popped corn 60 to eat.

Referring to FIG. 23, there is shown a folded container 51 as it would appear on a store shelf and how it will be opened.

The open chamber popper 54 is folded into three sections. The cover panel 59 is pressed over the sectioned tray 53, thus preventing the corn kernels from falling out of the corn kernel chambers.

The top section 63, would be pulled open first, exposing the center section 64. The center section 64 would be pulled open second, exposing the lower section 65, thus opening the open chamber popper 54 for insertion into the microwave oven.

Referring to FIG. 24, there is shown a section elevation of the open chamber popper 54 unfolded and ready for insertion into a microwave oven.

The container 51 is folded so that the corn kernels 56 or a charge are placed in the container 51 when it is packaged will cause it to unfold and expand when heated. The cover panel 59 is shown to be over the corn kernel chambers 55 preventing the corn kernels 56 from falling out during shipping and handling.

Referring to FIG. 25, there is shown a side section elevation as taken through FIG. 24 of the open chamber popper 54.

The cover panel 59 is shown as touching or near touching the top of the sectioned tray 53 to prevent the corn kernels 56 from falling out during handling.

Referring to FIG. 26, there is shown an enlarged section elevation of the pull open tab 52.

The pull open tab 52 has a horizontal tab 61 and a vertical tab 62 that are held together by a suitable adhesive 66 or glue. The adhesive 66 will allow the vertical tab 62 to be pulled away from the horizontal tab 61 without tearing any of the material that comprises the container 51 or the cover panel 59. When the horizontal tab 61 is pulled away from the vertical tab 62, the fingers and thumbs are protected from the escaping steam held within the container. The sectioned tray 53 is also fastened with a suitable glue 143 to the cover panel 59 in a manner that will not allow them to separate when the tabs are pulled apart.

Referring to FIG. 27, there is shown a plan view of an open chamber cassette 67.

The open chamber cassette 67 is made of aluminum or some other suitable metal or even a suitable non-metalic material. It is divided into corn kernel chambers 68 and each corn kernel chamber 68 is just large enough to contain one corn kernel. There is also a finger grip 70 at one end of the open chamber cassette 67 to grip when pushing the cassette 67 in or pulling it out of the popper.

Referring to FIG. 28, there is shown a section elevation as taken through FIG. 27 of the open chamber cassette 67. The corn kernels 69 are shown inserted into each corn kernel chamber 68.

Referring to FIG. 29, there is shown another section elevation as taken through FIG. 27.

The finger grip 70 is shown at one end of the open chamber cassette 67.

Referring to FIG. 30, there is shown an enlarged plan view of part of the open chamber cassette 67. The corn kernels 69 are contained in the corn kernel chambers 68. In those corn kernel chambers 68 where there are no corn kernels 69, the corn has already popped. The corn kernel chambers 68 are made up of the lower panel 71 on the bottom and the chamber walls 72 on the side. The finger grip 70 is also shown.

Figure 31:
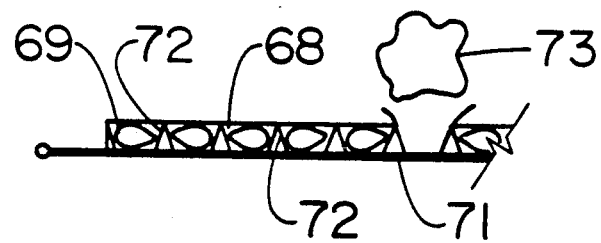
FIG. 31 is a section elevation taken through FIG. 30.

Referring to FIG. 31, there is shown a section elevation as taken through FIG. 30. The corn kernels 69 are shown contained in the corn kernel chambers 68 made up of the chamber walls 72 and the lower panel 71. The corn is shown popping up into popped corn 73.

The chamber walls 72 are shown in greater detail. The chamber walls have a slight batter or slope to them to allow the popping corn to easily move out of the corn kernel chambers.

Figure 32:
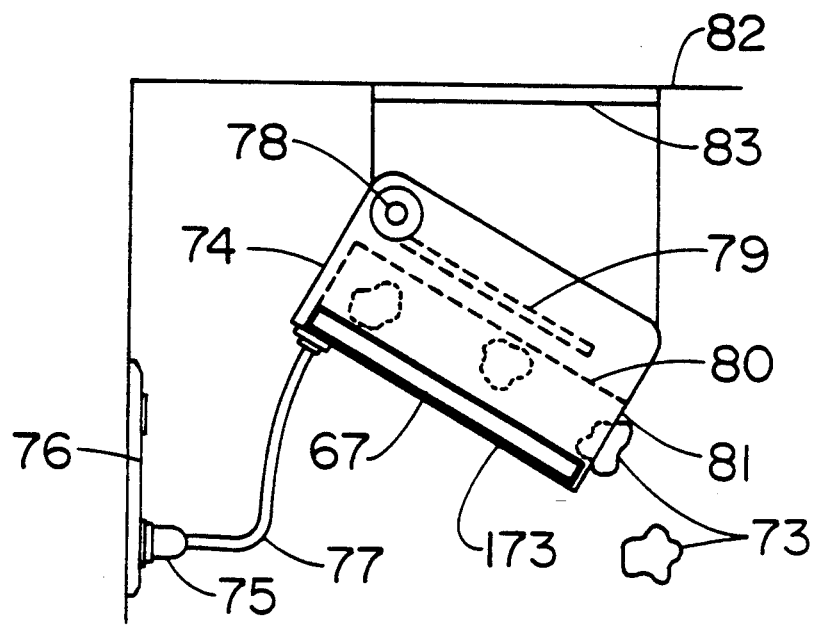
FIG. 32 is a side elevation of a popcorn popping device suspended from the bottom of a cupboard.

Referring to FIG. 32, there is shown an inclined popper 74. The inclined popper is block-like in shape with a hollow oven inside. The inclined popper 74 will use an open chamber cassette 67. The open chamber cassette 67 is shown inserted into the cassette slot 173 in the side of the inclined popper 74. The inclined popper 74 is further shown receiving its power from an electric plug 75 in a wall outlet 76; an electric cord 77 carries the power from the plug 75 into the inclined popper 74 where it runs through a switch 78 and into the heating element 79.

To operate, the open chamber cassette 67 is inserted into the inclined popper 74. The heating element 79 is heated and causes the corn kernels to heat up and pop into popped corn 73. When the corn pops, it strikes the screen 80 which prevents it from touching the heating element 79 and burning. The popped corn 73 rolls down the open chamber cassette 67 and falls out of the mouth 81 of the inclined popper 74 and into a suitable container.

The inclined popper 74 shown is an overhead mounted unit fastened to the under side of a cupboard 82 or a shelf or some other suitable item by a suitable overhead mounting 83. There are many types and means of mounting a device overhead so this type is a matter of design choice.

Figure 33:
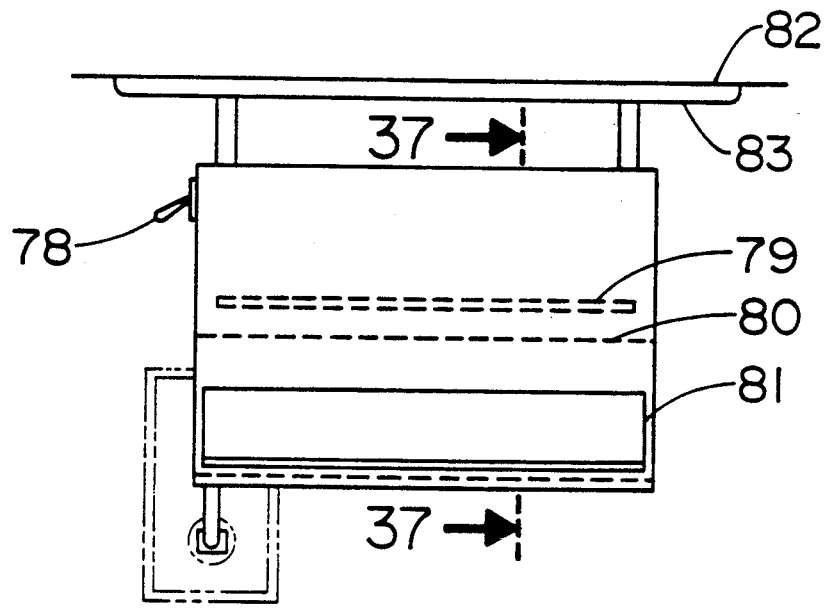
FIG. 33 is a frontal elevation of the cupboard mounted popcorn popping device of FIG. 32.

Referring to FIG. 33, there is shown an elevation of the inclined popper 74.

The mouth 81 extends almost the entire length of the inclined popper 74. The screen 80 is above the mouth. The heating element 79 is shown above the screen 80. The overhead mounting device 83 is shown mounted to the bottom of a cupboard 82. The switch 78 is shown on the left hand side. The location and type of switch 78 is a matter of design choice.

Figure 34:
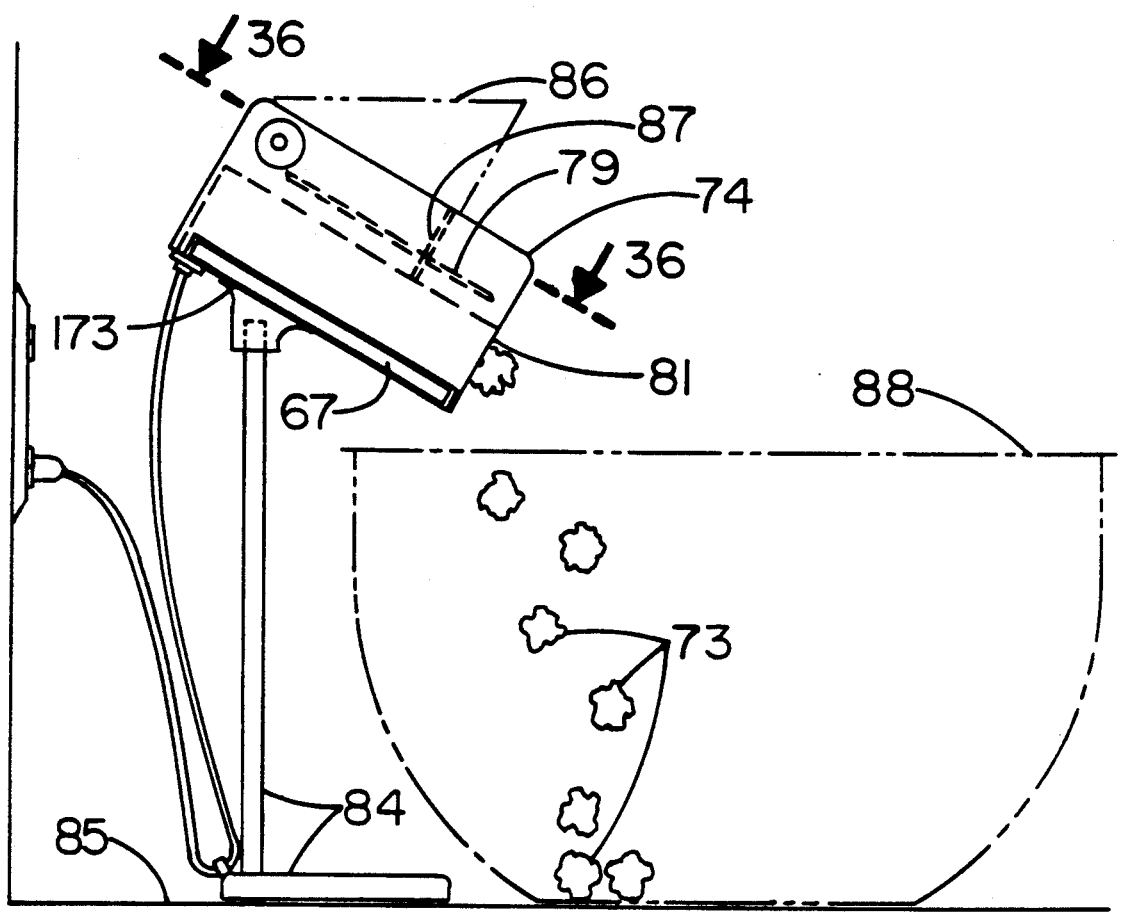
FIG. 34 is an elevation of a self standing popcorn popping device.

Referring to FIG. 34, there is the inclined popper 74 on a pedestal 84.

The pedestal 84 is shown setting on a counter top 85 or another suitable surface. The inclined popper 74, an oven with an inside and an outside, is also shown with a butter spreader 86. The butter spreader 86 is a hopper that holds butter or other suitable flavoring and further melts the butter with the heat of the heating element 79 or another heating element not shown. The melted butter will just drain down a series of tubes 87 and drip on the popped corn 73 as it rolls down the open chamber cassette 67.

All other parts of the inclined popper of FIG. 34 are the same as FIG. 32. The open chamber cassette 67 is inserted into the cassette slot 173 of the inclined popper 74, the heating element heats up the corn kernels that pop into popped corn 73 that falls out of the mouth 81 of the inclined popper and into a bowl 88 or some other suitable container.

Figure 35:
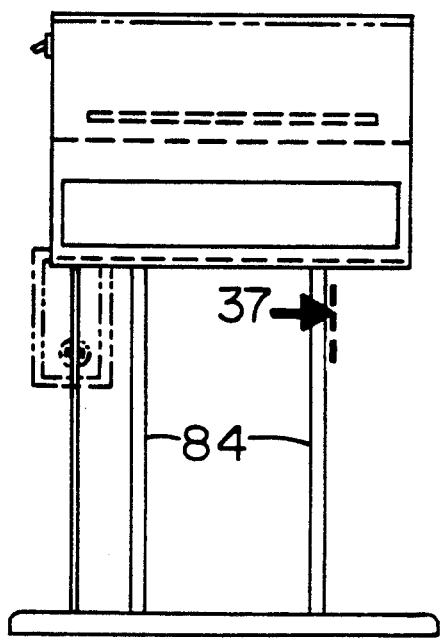
FIG. 35 is a frontal elevation of the free standing popcorn popping device of FIG. 34.

Referring to FIG. 35, there is shown an elevation of the inclined popper 74 on a pedestal 84. The inclined popper 74 of this view is the same as FIG. 33.

Figure 36:
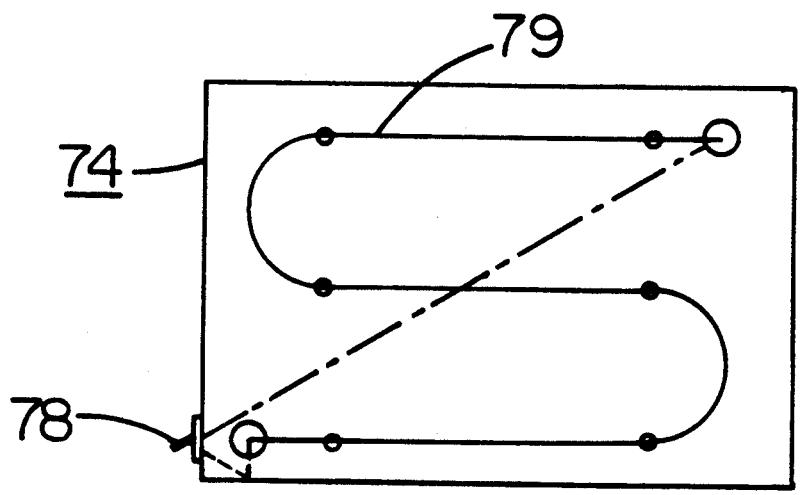
FIG. 36 is a sectional plan view of a heating element as taken through FIG. 34.

Referring to FIG. 36, there is shown a section view of the heating element 79 and the switch 78 in the inclined popper 74 as taken through FIG. 34.

Figure 37:
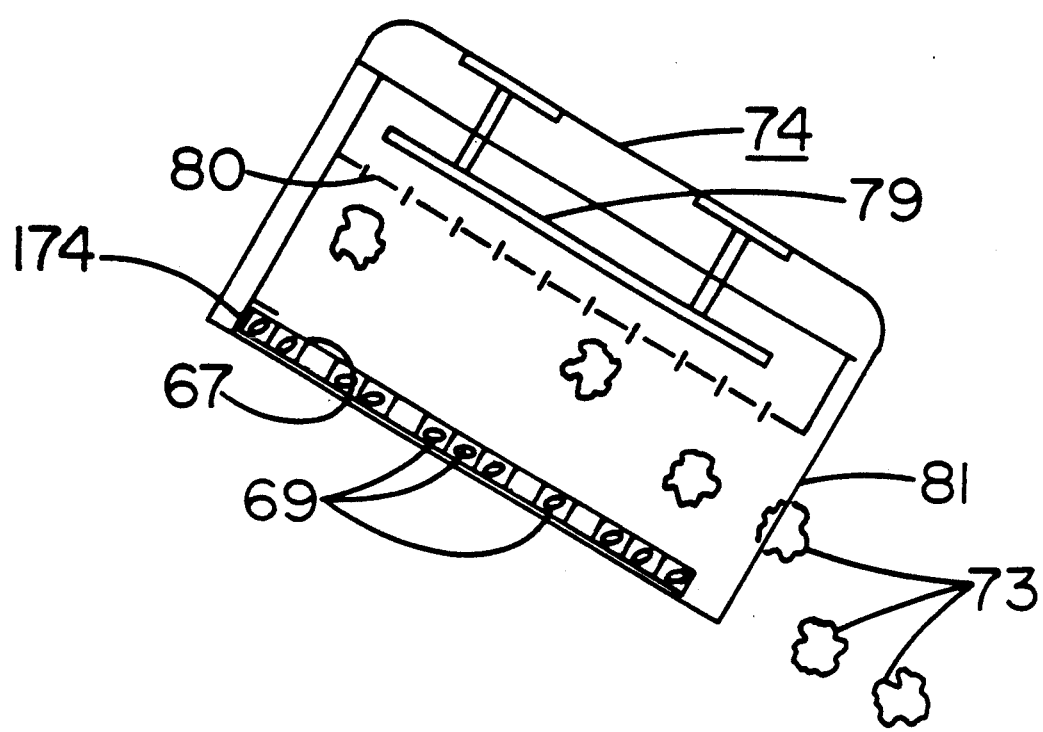
FIG. 37 is a section elevation as taken through FIG. 35.

Referring to FIG. 37, there is shown a section elevation of the inclined popper 74 as taken through FIG. 35.

The open chamber cassette 67 is shown inserted into the inclined popper 74 and is held in place by the cassette guides 174. As the corn kernels 69 pop into popped corn 73 they bounce into the screen 80 and further roll down the open chamber cassette 67 and out of the mouth 81. The corn kernels 69 are heated by the heating element 79.

Figure 38:
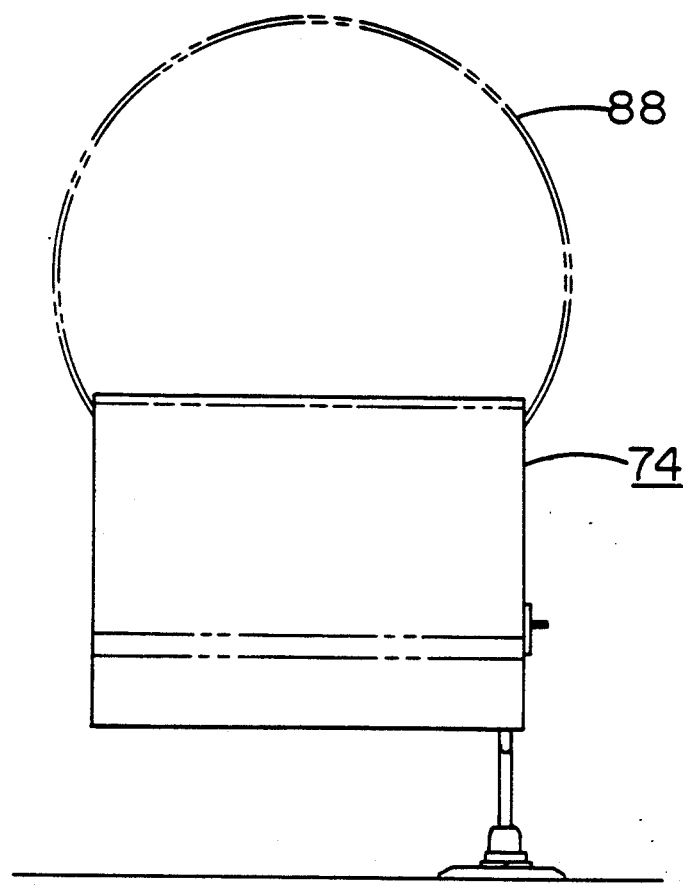
FIG. 38 is a plan view of the free standing popcorn popper.

Referring to FIG. 38, there is shown a plan view of the pedestal mounted inclined popper 74 over a bowl 88.

Figures 39, 40:
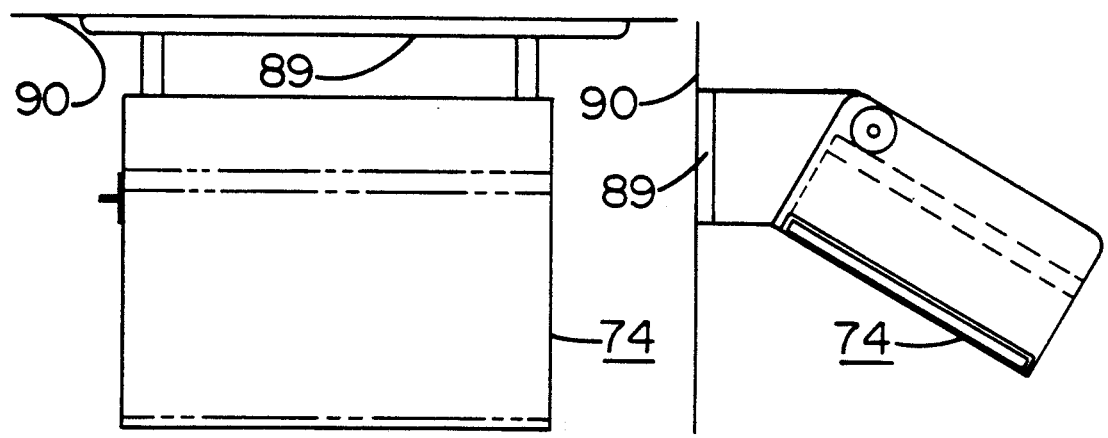
FIG. 39 is a plan view of a wall mounted popcorn popper.
FIG. 40 is an elevation of a wall mounted popcorn popper.

Referring to FIG. 39, there is shown a plan view of the inclined popper 74 on a wall mount device 89. The wall mount device 89 is shown suitably fastened to a wall 90.

Referring to FIG. 40, there is shown an elevation of the inclined popper 74 as it would be fastened to a wall 90 with a wall mount device 89.

Figure 41:
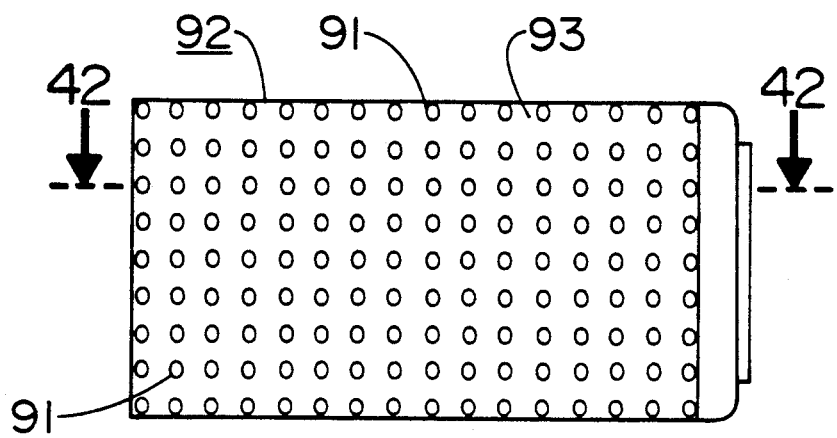
FIG. 41 is a plan view of a popcorn cassette with glue on corn.

Referring to FIG. 41, there is shown still another embodiment of a means of popping corn.

The corn kernels 91, are suitably attached to the corn cassette 92 by a suitable adhesive 93 or a suitable glue. The adhesive 93 or glue is a digestible non-toxic material that has no taste or enhances the taste of the popped corn that will hold the corn kernels 91 to the corn cassette 92 even in conditions of intense heat or cold or moreover in conditions where there is movement or possible vibrations. The corn cassette 92 will hold corn kernels 91 upside down or with the corn kernels 91 on top of the corn cassette 92. The corn cassette 92 is to be made of any suitable material by design choice.

When the corn cassette 92 is inserted into a heating device such as a microwave oven or a convection oven or a corn popper, the corn kernels 91 will be sufficiently heated until they explode or pop. When the corn kernels 91 explode or pop, the shock from the explosion or pop, combined with the change in shape of the corn kernel 91 into popped corn will dislodge the popped corn from the adhesive 93 or corn cassette 92.

Figure 42:
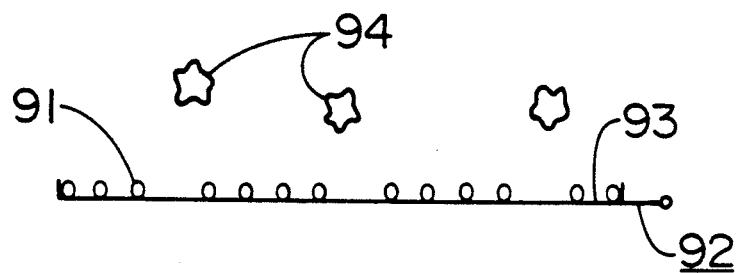
FIG. 42 is a section elevation of the popcorn cassette as taken through FIG. 41.

Referring to FIG. 42, there is shown a section elevation as taken through FIG. 41 of the corn kernels 91 glued to the corn cassette 92.

The corn cassette 92 of FIG. 42 is shown with the corn kernels 91 on top, but it could be used in an inverted position also. The corn kernels 91 could also be placed on both the top side and the underside of the corn cassette 92 at the same time. Some of the corn kernels of FIG. 42 are shown popping into popped corn 94.

The glue 93 can be applied to the corn kernels 91 which will then be placed on the corn cassette 92, or the glue 93 can be place on the corn cassette 92 in precise spots or over the entire corn cassette 92 and the corn kernels 91 can be applied afterward.

The corn cassette 92 with glued on corn kernels 91 can be used on the corn sheet of FIG. 1, FIG. 7, FIG. 10, the corn cassette or FIG. 13, 14, 16, 17, and 18, the sectioned tray of FIG. 20, 22 the open chamber cassette of FIG. 27, 30, 31, 32, 34, and 37.

Figure 43:
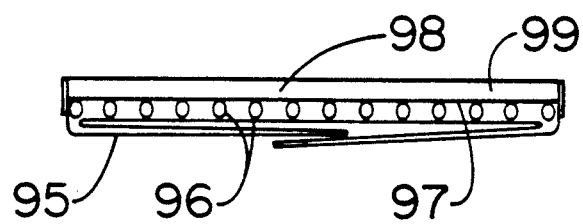
FIG. 43 is a section elevation of a folded bag with a glue on corn kernel panel.

Referring to FIG. 43, there is shown a section elevation of folded bag 95 with glue on corn kernels 96 and the corn panel 97.

The bag 95 is folded as it would appear on a store shelf or cupboard shelf at home, etc. The corn kernels 96 are shown glued onto the corn panel 97 in the same manner as with the corn cassette of FIGS. 41 and 42.

Above the corn panel 97 is a flavor chamber 98 that will hold butter, salt, or other suitable flavoring ingredients 99.

Figure 44:
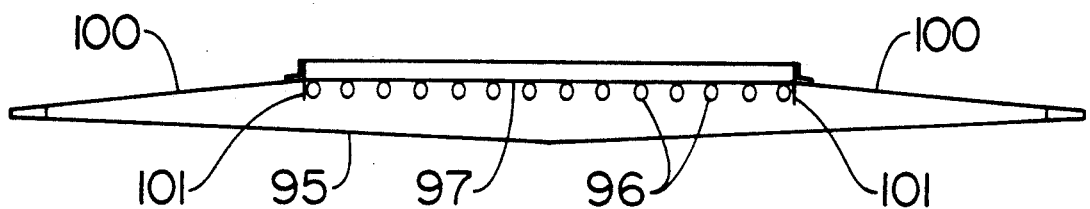
FIG. 44 is a section elevation of an unfolded bag with a glue on corn kernel panel.

Referring to FIG. 44, there is shown a section elevation of the bag 95 unfolded ready to be expanded. The end wings 100 are shown pulled out. The lip 101 is shown on each side of the corn panel 97 to prevent the bottom part of the bag 95 from rubbing off the corn kernels 96 while the bag 95 is folded.

Figure 45:
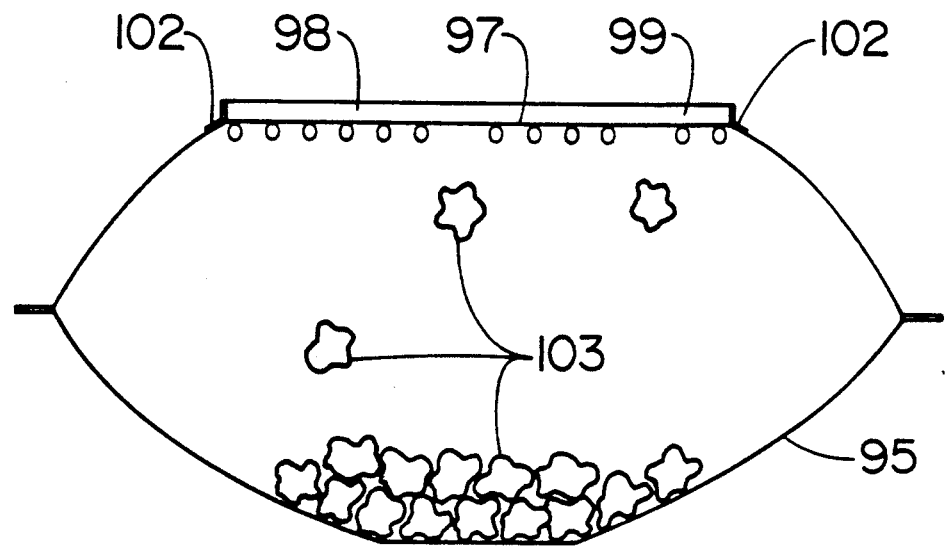
FIG. 45 is a section elevation of an expanded bag with a glue on corn kernel panel.

Referring to FIG. 45, there is shown a section elevation of the bag 95 after it has been expanded by a charge of heated gas that was either inserted into the bag or from out of the corn kernels 96 as they are popped.

The flavoring ingredients 99 are shown falling through small holes 142 in the corn panel 97. The flavoring ingredients 99 are melted in the flavor chamber 98 prior to filtering through the holes 142 in the corn panel 97.

The corn panel 97 and flavor chamber 98 are shown fixed to the bag 95 by tape 102. When the corn kernels 96 are popped into popped corn 103 and ready to be eaten, the tape 102 is removed and the corn panel 97 and flavor chamber 98 is removed from the bag with the tape 102 leaving a hole in the top of the bag 95 from which the popped corn 103 can be removed with the fingers and eaten.

Figure 46:
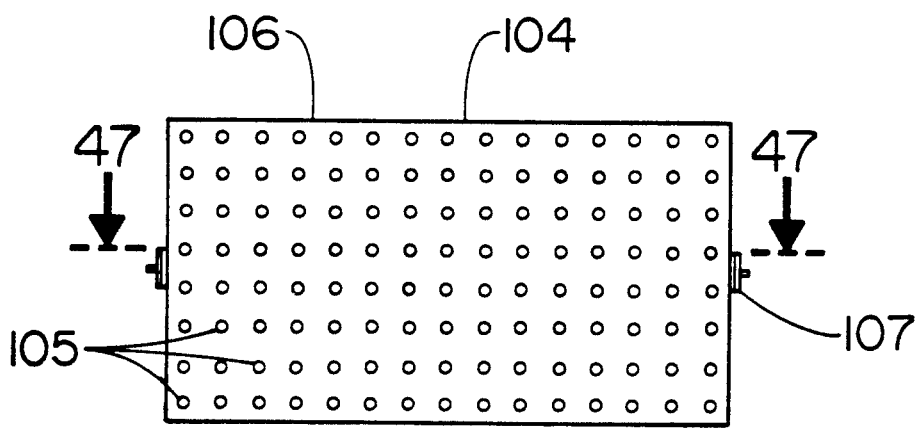
FIG. 46 is a plan view of a foam corn kernel block.

Referring to FIG. 46, there is shown a foam corn kernel block 104.

The foam corn kernel block 104 is made up of styrofoam or plastic or rubber or some other suitable material that is non-toxic and or digestible. The foam 106 acts as a base or foundation to support a mass of corn kernels 105. There are many possible shapes to the foam corn kernel block 104, it could be round, triangular, or square, etc. by design choice.

On each side of the foam corn kernel block 104 is a suspension means 107. The suspension means 107 supports the foam corn kernel block 104 on each side when in a bowl within a microwave oven. This will be further explained in FIG. 47.

Figure 47:
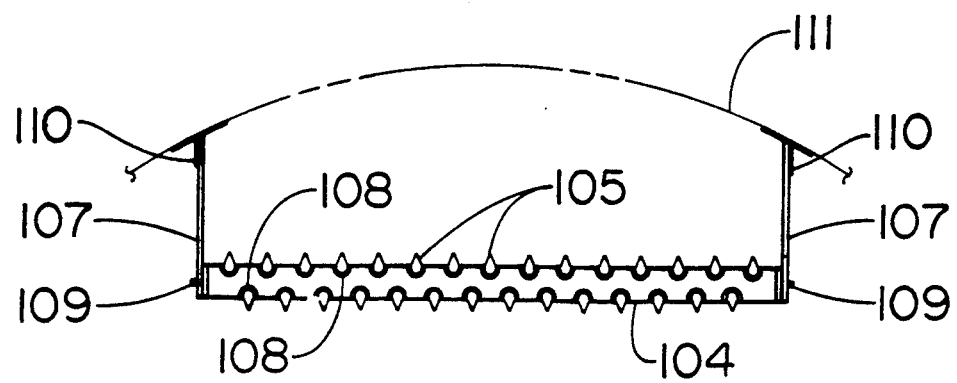
FIG. 47 is a section elevation of the foam corn kernel block as taken through FIG. 46.

Referring to FIG. 47, there is shown a section elevation as taken through FIG. 46 of the foam corn kernel block 104 with the corn kernels 105 inserted into the foam corn kernel block 104. Some of the corn kernels 105 are shown inserted into foam corn kernel block 104 with flavoring 108 such as oil, butter, or salt. The flavoring 108 can be inserted into the foam corn kernel block 104 before, during or after the corn kernels 105 have been inserted into the foam corn kernel block 104. The flavoring 108 will only come out after the corn kernel 105 has been popped.

The foam corn kernel block 104 is shown supported by a suspension means 107 that is suitably fixed to the corn kernel block 104 by a pin 109. The pin 109 is so fixed to the corn kernel block 104 that it will allow the corn kernel block 104 to rotate as the corn kernels 105 pop. The suspension means 107 is further fixed to the bowl cover 111 by tape 110.

Figure 48:
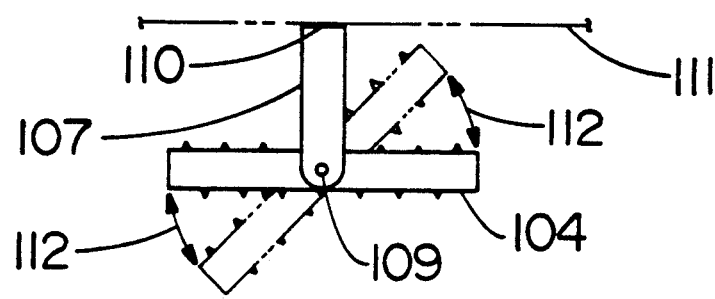
FIG. 48 is a side elevation view of the foam corn kernel block.

Referring to FIG. 48, there is shown a side elevation of the foam corn kernel block 104 on the suspension means 107.

The suspension means 107 is shown supported or held at the upper end to the bowl cover 111 by tape 110. At the lower end the pin 109 is shown fixed to the suspension means 107 and is further suitably fastened to the foam corn kernel block 104 to allow the corn kernel block 104 to rotate 112 in either direction as the corn pops.

Figure 49:
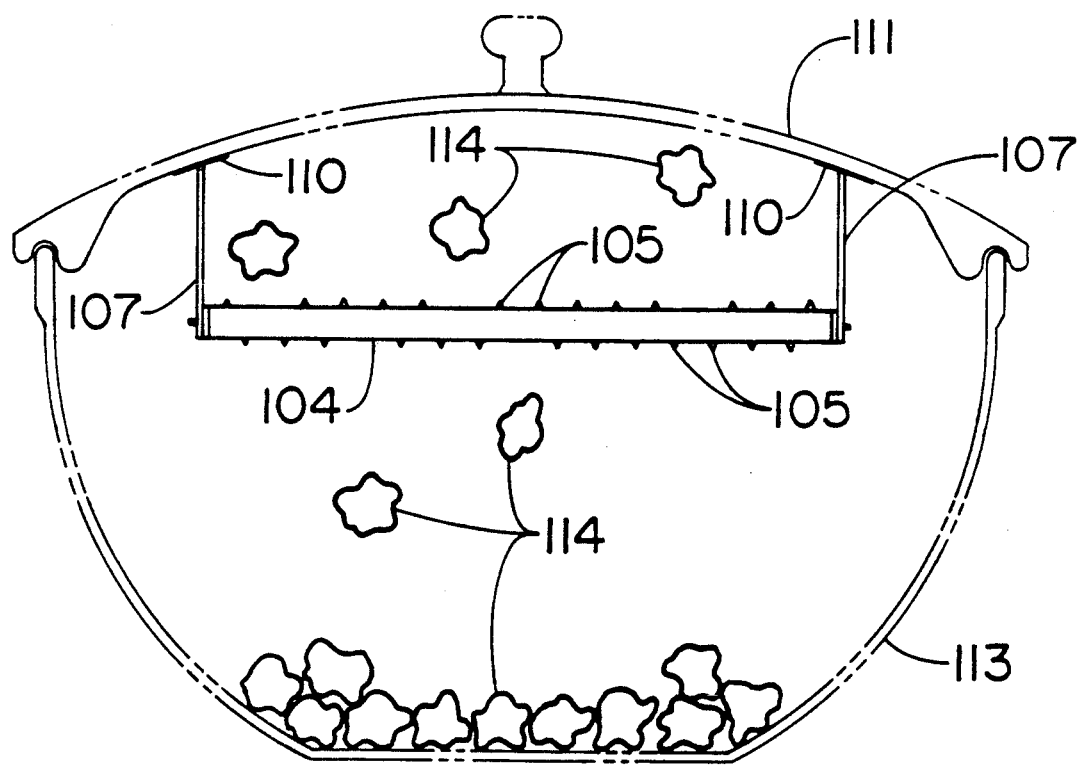
FIG. 49 is a section elevation of the corn kernel block in a bowl.

Referring to FIG. 49, there is shown a section elevation of the foam corn kernel block 104 in a bowl 113.

The foam corn kernel block 104 with the corn kernels 105 imbedded in the foam corn kernel block 104 is shown supported by the suspension means 107 that is held to the underside of the bowl cover 111 by tape 110.

The corn kernels 105 are shown popping into popped corn 114 and falling into the bottom of the bowl 113 which will also be a means of serving the popped corn 114.

When the corn kernels 105 are popped into popped corn 114, the foam corn kernel block 104 will be removed from the bowl cover 111 and will be reused or thrown away.

The corn kernels 105 are popped in the case of FIG. 49 by either a microwave oven or a convection oven not shown in this view, but shown in other views. The foam corn kernel block 104 could also be used as a corn cassette as shown in FIG. 13 and 32 or it could be shown as a corn kernel panel as shown in FIG. 2. It could also be used with a bag as shown in FIG. 45 all of which could be a matter of design choice.

Figure 50:
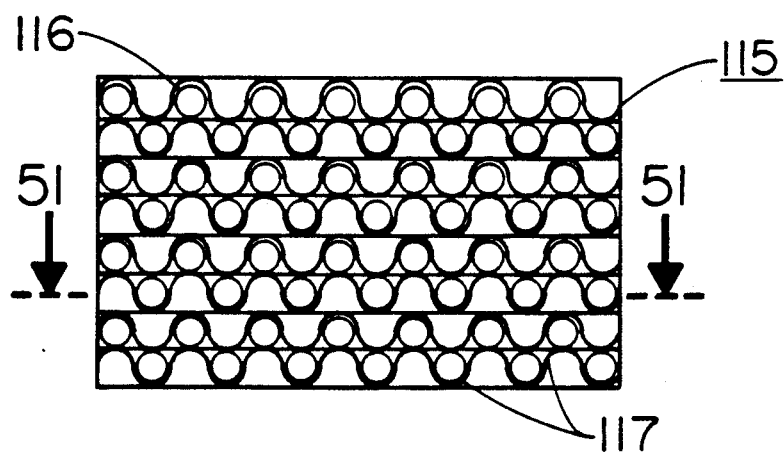
FIG. 50 is a plan view of a corrugated corn kernel cassette.

Referring to FIG. 50, there is shown a plan view of a corrugated corn kernel cassette 115. The cover panel is not shown in this figure for clarity.

The corn kernels 116 are shown inserted into the corrugations 117. The corn kernels 116 are held in place by friction if the cassette is used in an upside down position or they could be held in place by gravity if used in the position shown. They are also held in place by a cover panel if desirable. The corn kernels 116 are shown in a staggered position to allow the corn kernels 116 to pop without affecting the unpopped corn kernels 116. They could however be inserted into each corrugation 117 if desirable.

The corrugated corn kernel cassette 115 shown is made out of paper, however it could also be constructed of plastic or another suitable material. The corn kernel cassette 115 could also be made into a corn panel as shown in FIG. 1, a corn kernel cassette as shown in FIG. 13, a corn kernel chamber of FIG. 21 or with a corn bag of FIG. 45 or with the suspension means of FIG. 49. All of these would be a matter of design choice.

Figure 51:
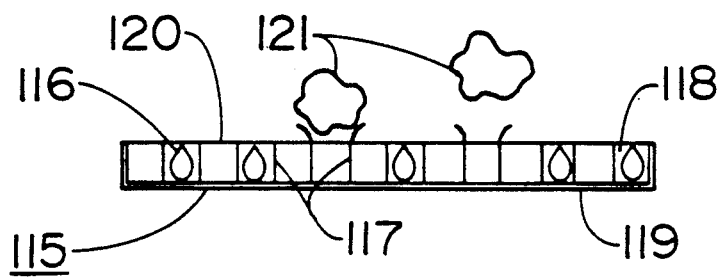
FIG. 51 is a section elevation of a corn kernel cassette as taken through FIG. 50.

Referring to FIG. 51, there is shown a section elevation of the corrugated corn kernel cassette 115 as taken through FIG. 50.

The corn kernels 116 are shown inserted into the corrugation 117. The corn kernels 116 are also shown with flavoring 118, such as butter or oil and salt, etc.

The corrugated corn kernel cassette 115 is shown with a bottom panel 119 that is suitably fastened to the corrugations 117 by glue or other suitable means. The bottom panel 119 will hold the shape of the corrugated corn kernel cassette 115 and will be a means of sealing the bottom of the corrugations in order to better contain the corn kernels 116 and the flavoring 118.

The corrugated corn kernel cassette 115 has a cover panel 120 that is made out of tissue paper or another suitable material that will easily tear when the corn kernels 116 pop into popped corn 121. The cover panel 120 will allow the corrugated corn kernel cassette 115 to be used in an inverted position, while holding the corn kernels 116 and flavoring 118 in place until the corn kernels 116 pop, thus releasing the popped corn 121 with the flavoring 118, thus assuring an even distribution or a constant ratio of popped corn 121 and flavoring 118.

The corrugated corn kernel cassette 115 could be used with the popcorn sheet of FIG. 1, the corn cassette of FIG. 13, the sectioned tray of FIG. 22, the inclined popper of FIG. 32, the bag of FIG. 45 and the bowl of FIG. 49.

FIG. 51a, 51b, 51c, and 51d show various methods of applying corrugations to popping corn.

Figure 51A:
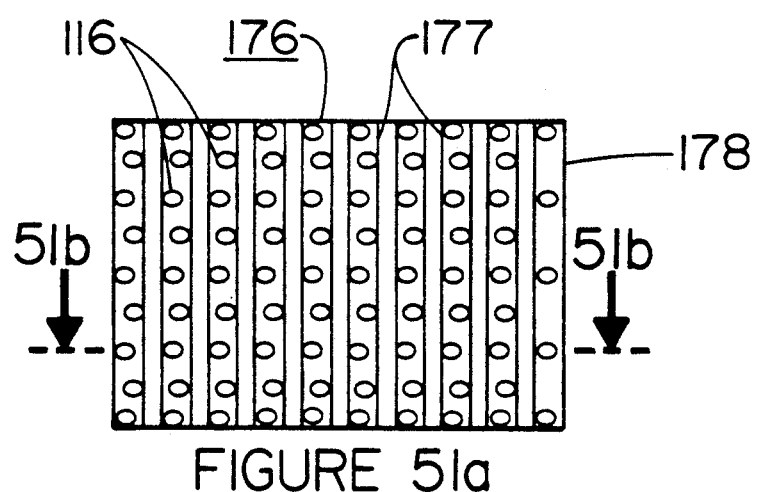
FIG. 51a is a plan view of a rectangular corrugation cassette.

FIG. 51a is a plan view of a rectangular corrugation cassette 176. The purpose of the rectangular corrugations 177 is to place more corn kernels 116 into a smaller area. Still another purpose of the rectangular corrugations 177 is to allow the paper 178 to absorb the shock of the corn kernels 116 as they explode into popped corn. The rectangular corrugation cassette 176 is made out of paper 178 or other suitable materials.

Figure 51B:
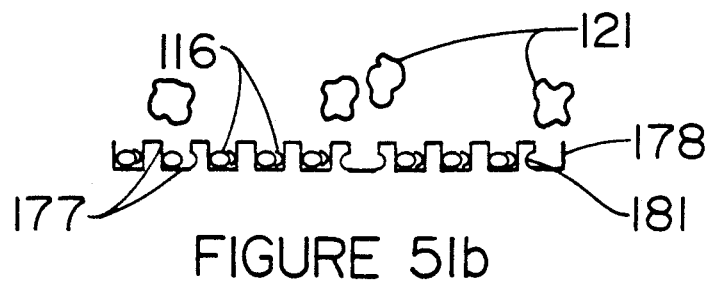

FIG. 51b is a section elevation of the rectangular corrugation cassette 176. The corn kernels 116 are shown fixed to the rectangular corrugations 177 with glue. As the corn kernels 116 are heated, they explode into popped corn 121. As they explode, they may temporarily or permanently deform the rectangular corrugations 177. The deformation 181 is caused by the paper 178 absorbing the energy of the exploding corn kernels 116 into popped corn 121. The ability of the rectangular corrugations 177 to absorb energy will prevent the corn kernels 116 next to the popping corn 121 from being dislodged; the paper 178 will act as a spring.

FIG. 51b is shown inverted for clarity; normally the corn kernels 116 are on the lower side of the rectangular corrugation cassette 176. The rectangular corrugation cassette 176 could be used in a vertical mode also.

Figure 51C:
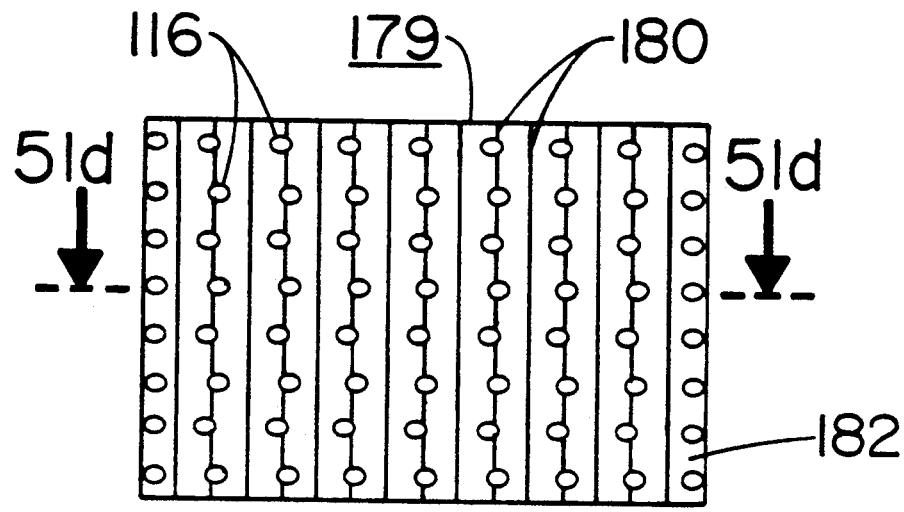
FIG. 51c is a plan view of a triangular corrugation cassette.

Referring to FIG. 51c, there is shown a plan view of a triangular corrugation cassette 179. The purpose of the triangular corrugations 180 is to place more corn kernels 116 into a smaller area. Still another purpose of the triangular corrugations 180 is to allow the paper 182 to absorb the shock of the corn kernels 116 as they explode into popped corn. The triangular corrugation cassette is made out of paper 182 or other suitable material.

FIG. 51c is a section elevation as taken through FIG. 51c.

The corn kernels 116 are shown fixed to the triangular corrugations 180 with glue. As the corn kernels 116 are heated, they explode into popped corn 121. As they explode, they temporarily or permanently deform the triangular corrugations 180. The deformation 183 is caused by the paper 182 absorbing the energy of the exploding corn kernels 116 into popped corn 121. The ability of the triangular corrugations 180 to absorb energy will prevent the corn kernels 116, next to the popping corn 121, from being dislodged; the paper 182 will act as a spring.

Figure 51D:
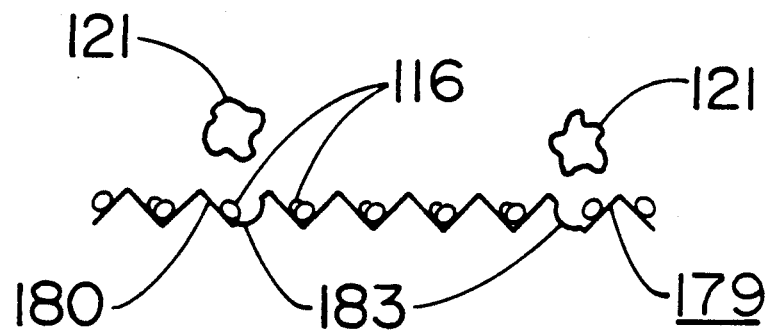
FIG. 51d is a section elevation as taken through FIG. 51c.

FIG. 51d is shown inverted for clarity; normally the corn kernels 116 are on the lower side of the triangular corrugated cassette 179. The triangular corrugation cassette 179 would also be used in a vertical mode.

Figure 52:
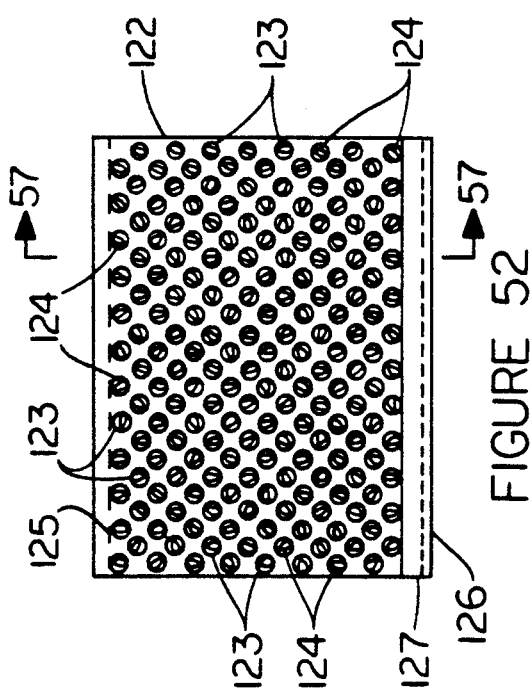
FIG. 52 is a plan view of a foil cassette.

Referring to FIG. 52, there is shown a plan view to still another corn kernel casette 122. This corn kernel cassette 122 is made out of a sheet of metal foil, paper, plastic or other suitable combustion resistant material. There are dimples 123 shown that are formed into the corn kernel cassette 122 that will hold corn kernels 124. The dimples 123 can be formed by pressing the corn kernels 124 into the metal foil or paper or other suitable material or the dimples 123 can be formed by a machine stamping means followed by the insertion of the corn kernels 124 into the dimples 123.

Figure 56:
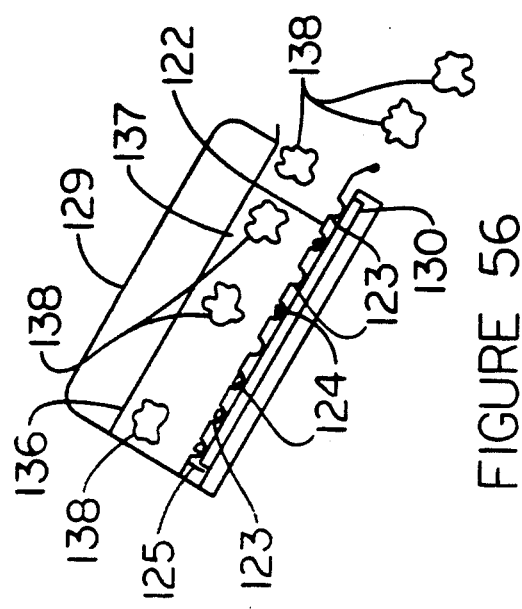
FIG. 56 is a section elevation of the foil cassette within the popper device.

The corn kernels 124 can be held in place in the dimples 123 of the corn kernel cassette 122 by a cover sheet not shown that would form a burst panel as shown on the cassette of FIGS. 14 and 15; this would allow the corn kernel cassette 122 to be inverted or placed in a vertical position as shown in FIGS. 16, 17 or 18. The corn kernels 124 can also be held in place by gravity when used in the manner as shown in FIG. 56. The corn kernels 124 can also be held in place in the dimples 123 during shipping and packaging by the flavoring not shown in this view, which would act as an adhesive when cool but would melt when heated, thus releasing the corn kernels 124 as they pop into popped corn. The corn kernels could also be held in the dimples 123 by friction if the dimples 123 are formed slightly smaller than the corn kernels 124 and the corn kernels 124 are forced into the dimples 123.

The corn kernels 124 can be orderly placed on the sheet forming the corn kernel cassette 122. A thinner cover sheet not shown or a cover sheet made of a more brittle material can be placed over the corn kernels 124 and the corn kernel cassette 122, sandwiching the corn kernels 124 between the corn kernel cassette 122 sheet and the thinner or more brittle cover sheet.

The corn kernel cassette is shown as a rectangle but it could be a circle or any other configuration.

On one end of the corn kernel cassette is a hook 125 shown with hidden lines. The hook 125 is designed to hold the corn kernel cassette 122 in place when it is inserted into a heating device or corn popper as shown in FIGS. 65 and 66. The hook 125 is shown on one end of the corn kernel cassette 122 however it could be at either end of the corn kernel cassette 122 by design choice. There are also many variations of the hook 125 that could be applied by design choice.

At the other end of the corn kernel cassette 122 is the finger grip 126 and lip 127. The finger grip 126 is for ease of gripping the corn kernel cassette 122 while inserting it into the popcorn popper or removing it from the popper. The lip 127 is to direct the popped corn away from the popper as they fall out of the popper.

Figure 53:
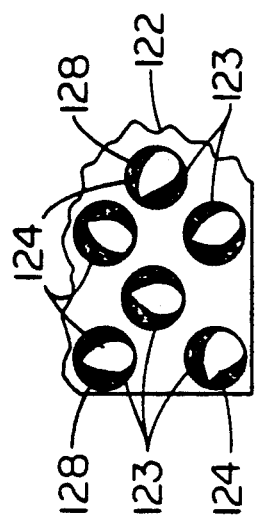
FIG. 53 is an enlarged section of the foil cassette.

Referring to FIG. 53, there is shown an enlarged section of the corn kernel cassette 122 as taken from FIG. 52 showing the corn kernels 124 in the dimples 123. The dark area is the flavoring 128 which could also be used to hold the corn kernels 124 in the corn kernel cassette 122.

Figure 54:
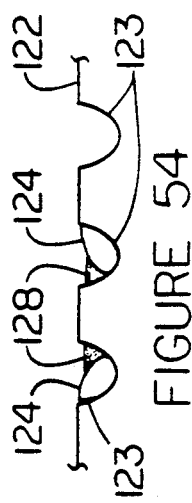
FIG. 54 is an enlarged section elevation of part of the foil cassette.

Referring to FIG. 54, there is further shown an enlarged section elevation of the corn kernel cassette 122 as taken through FIG. 52. The corn kernels 124 are shown in the dimples 123 with the flavoring 128.

Figure 55:
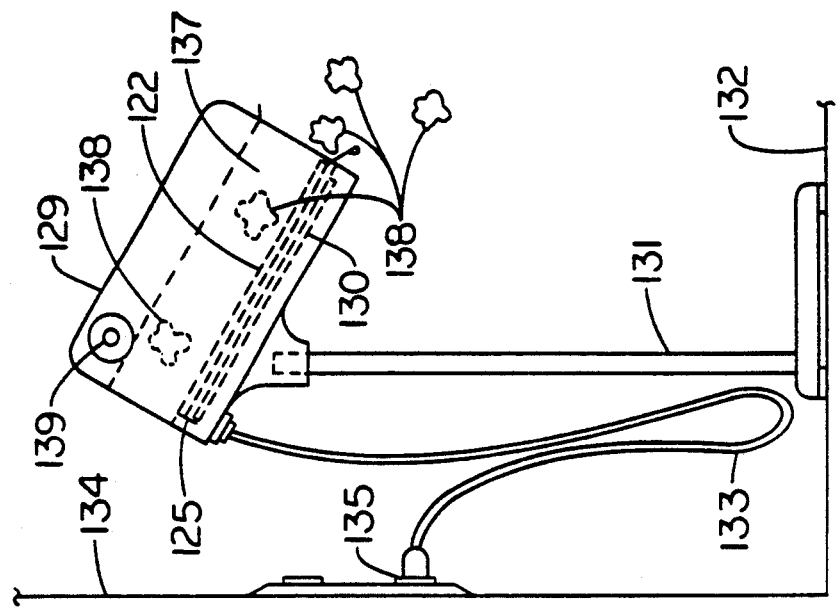
FIG. 55 is a elevation of a popper device that holds the foil cassette.

Referring to FIG. 55, there is shown still another popcorn popping device 129. The popcorn popping device 129 is a block shaped oven-like device with a hollow inside that is shown supported on a stand 131 which is on a counter top 132. The popcorn popping device 129, receives the necessary electric or gas energy from a power line 133 and a plug that is inserted into a wall outlet 135 in the wall 134. The popping device 129 is turned on and off by a switch 139.

The corn kernel cassette 122 is shown (with hidden lines) inserted into the sloping popping chamber 137. The hook 125 is caught on the end of the heating element 130. The switch 139 is turned on causing the heat element 130 to heat up. The heat is transferred to the corn kernel cassette 122 which in turn heats the corn kernels and the flavoring. When the corn kernels are sufficiently heated, they explode into popped corn 138 and further are contained in the sloping popping chamber 137 until they fall out of the sloping popping chamber 137 into a bowl not shown or some other suitable container.

Although this popcorn popping device is shown on a stand 131, it could also be held in place by a wall mount not shown or a overhead mount also not shown.

Referring to FIG. 56, there is shown a section elevation of the popcorn popping device 129. The corn kernels 124 are shown contained in the dimples 123 of the corn kernel cassette 122. Some of the corn kernels 124 are shown exploding into popped corn 138 where they strike the ceiling 136 of the sloping popping chamber 137, where they further fall out of the sloping popping chamber 137. The purpose of the sloping popping chamber 137 is to cause the popped corn 138 to roll down and fall out of the popcorn popping device 129.

The hook 125 is also shown caught in the heating element 130, thus preventing the corn kernel cassette 122 from sliding out of the sloping popping chamber 137 as the corn kernels 124 pop into popped corn 138.

Figure 57:
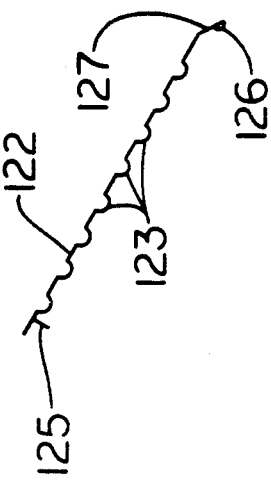
FIG. 57 is a section elevation of the foil cassette as taken through FIG. 52.

Referring to FIG. 57, there is shown a section elevation of the corn kernel cassette 122. The hook 125 is shown at the upper end of the corn kernel cassette 122. The dimples 123 are shown as they would be formed into the foil material that the corn kernel cassette 122 is made of. At the lower end of the corn kernel cassette 122 is shown the finger grip 126 and the lip 127.

Figure 58:
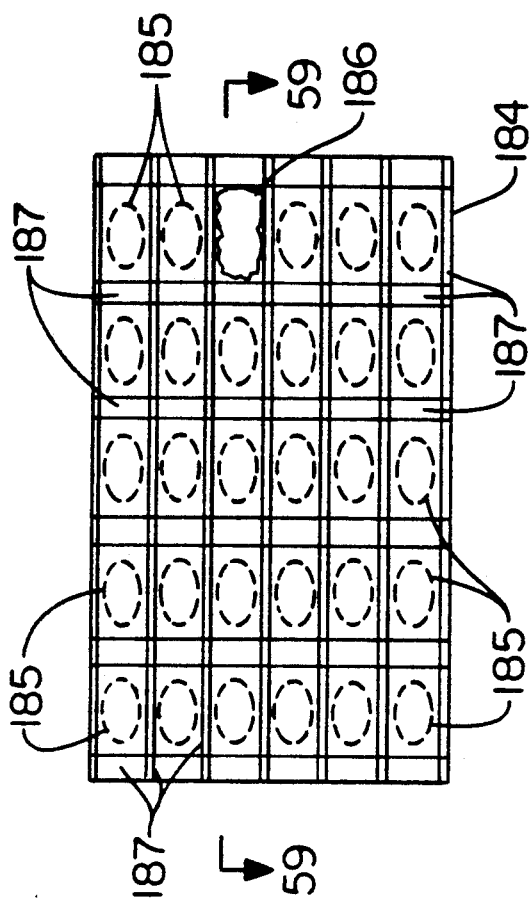
FIG. 58 is a plan view of another cassette with two sheets formed over corn kernels.

Referring to FIG. 58, there is shown still another corn cassette 184 in which the corn kernels 185 are sandwiched between two sheets. The two sheets are held together by a suitable adhesive 187 or other suitable means such as stamping or bonding. One corn kernel has been popped out of the corn cassette 184 leaving an open space 186.

Figure 59:
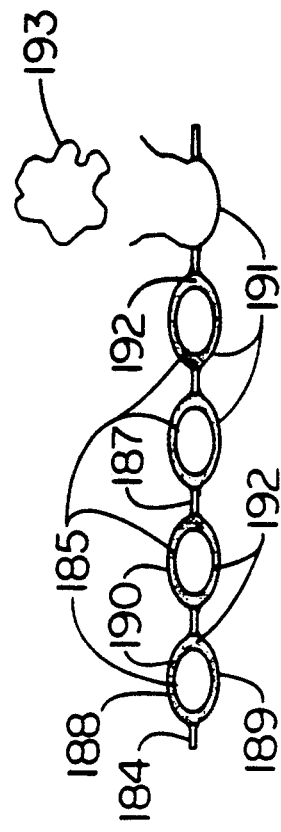
FIG. 59 is a section elevation as taken through FIG. 58.

Referring to FIG. 59, there is shown a section elevation as taken through FIG. 58.

The corn kernel cassette 184 is formed by the upper sheet 188 and the lower sheet 189 being formed over the corn kernels 185 forming upper dimples 190 and lower dimples 191. The corn kernels 185 are sandwiched between the upper sheet 188 and the lower sheet 189 with flavoring 192. The upper sheet 188 and the lower sheet 189 are shown joined together between the corn kernels 185 by adhesive 187 or some other suitable means.

The upper sheet 188 in this particular case would be thinner and or more brittle than the lower sheet 189 which will allow the corn kernels 185 to be heated and pop into popped corn 193 and pop out of the upper dimple 190 of the upper sheet 188 without disturbing the unpopped corn kernels 185 that are sandwiched between the upper sheet 188 and the lower sheet 189.

Figure 60:
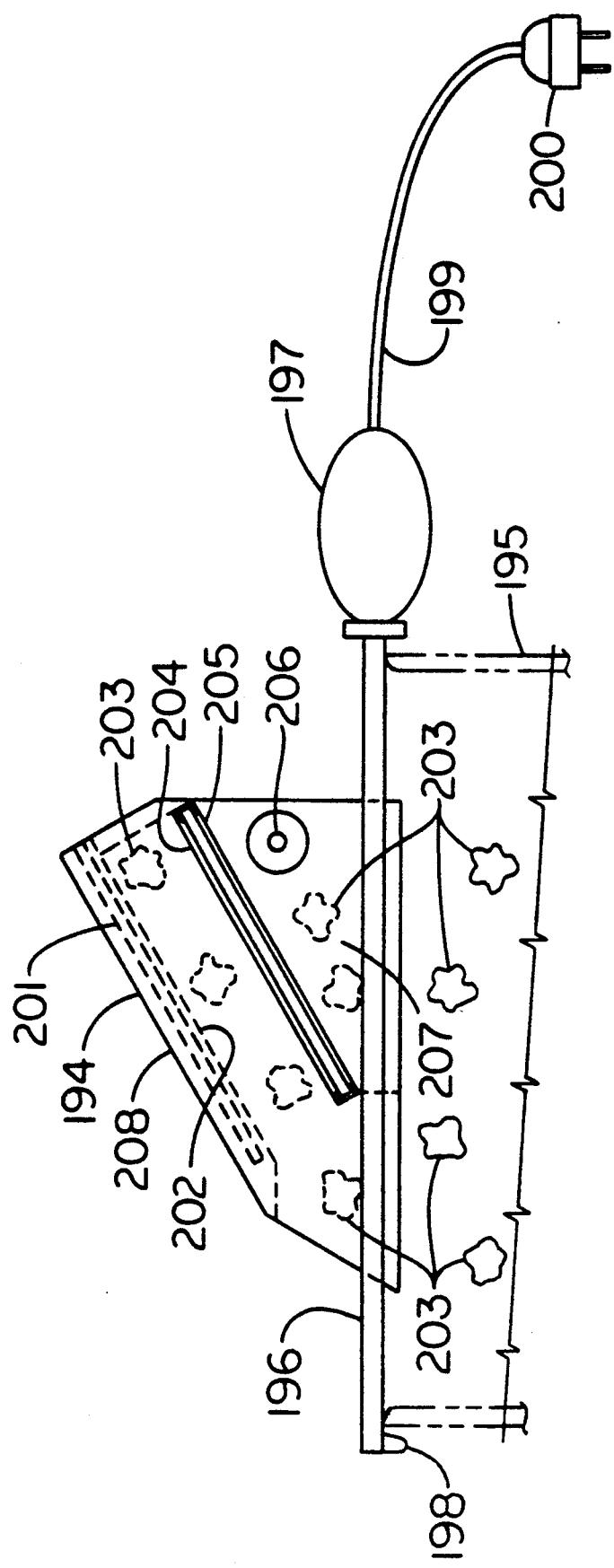
FIG. 60 us an elevation of a bowl top corn popper.

Referring to FIG. 60, there is shown an outside elevation of a bowl top corn popper 194.

The bowl top popper 194 has a block shaped exterior and a hollow oven-like interior. The exterior having a top surface and side surface. The interior is a hollow oven with a heater 201 and is shown on top of a bowl 195. The bowl 195 shown is round, but it could be of any suitable shape or size. The bowl top popper 194 is supported on the bowl by support frame 196. The support frame 196 spans the bowl 195 and has a handle 197 in one side and a stop 198. The stop 198 prevents the support frame 196 from slipping off of the bowl 195. The handle 197 allows the bowl top popper 194 to be held in one or two hands without being burned. The handle 197 can be made out of wood or other suitable materials. At the other end of the handle 197 is an electric cord 199 and a plug 200 for a power source.

The bowl top popper 194 has a heater 201 shown with hidden lines. The heater 201 is covered by a cover plate 202 on the inside to prevent popped corn 203 from striking the heater 201. A corn cassette 204 similar to the cassettes of FIGS. 14, 27, 41, 46, 50, 51a, 51b, 60 or 58 is shown inserted into the side slot 205 of the bowl top popper 194. There is also a switch 206 shown on the side 207 of the bowl top popper 194. Both the switch 206 and the side slot 205 could be located on the top surface 208 or other side of the bowl top popper 194.

Figure 61:
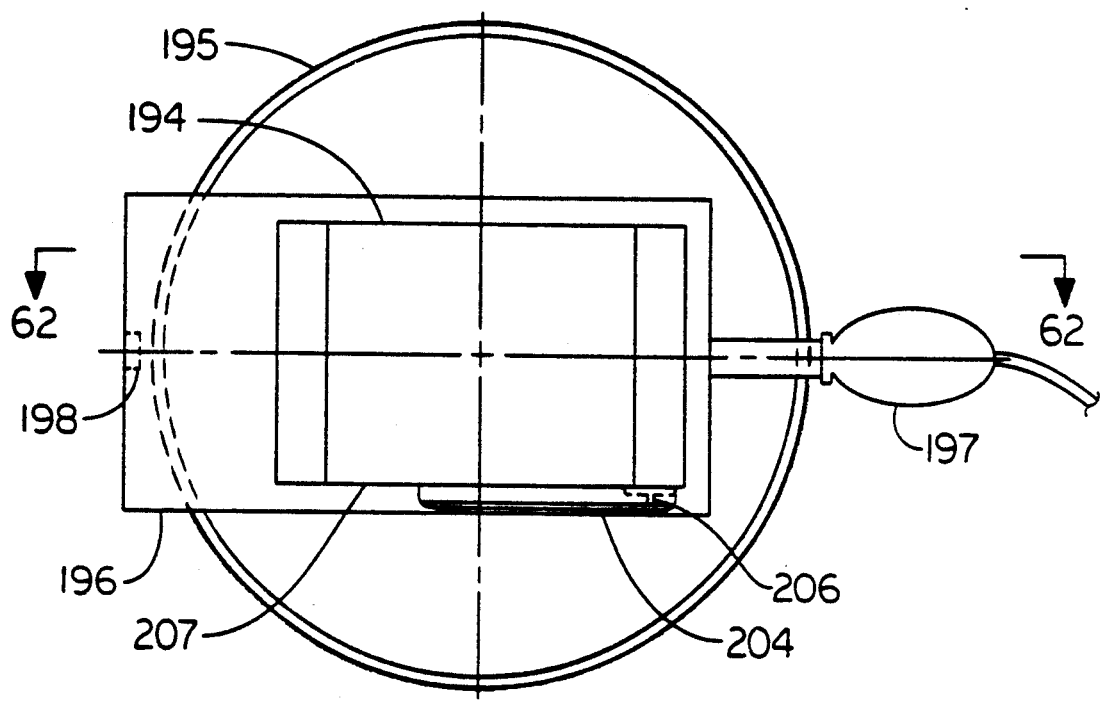
FIG. 61 is a plan view of a bowl top corn popper supported on a bowl.

Referring to FIG. 61, there is shown a plan view of the bowl top popper 194 shown setting on top of a bowl 195. The support frame 196 is shown spanning the bowl 195 and supporting the bowl top popper 194 above the bowl 195. The stop 198 is shown with hidden lines and the handle 197 is shown at the other end of the support frame 196. Part of the corn cassette 204 is shown projecting out of the side 207 of the bowl top popper 194 which will allow the corn cassette 204 to be gripped with finders or other suitable means to further pull the corn cassette 204 out of the bowl top popper 194. The switch 206 is shown with hidden lines because it is below the corn cassette 204.

Figure 62:
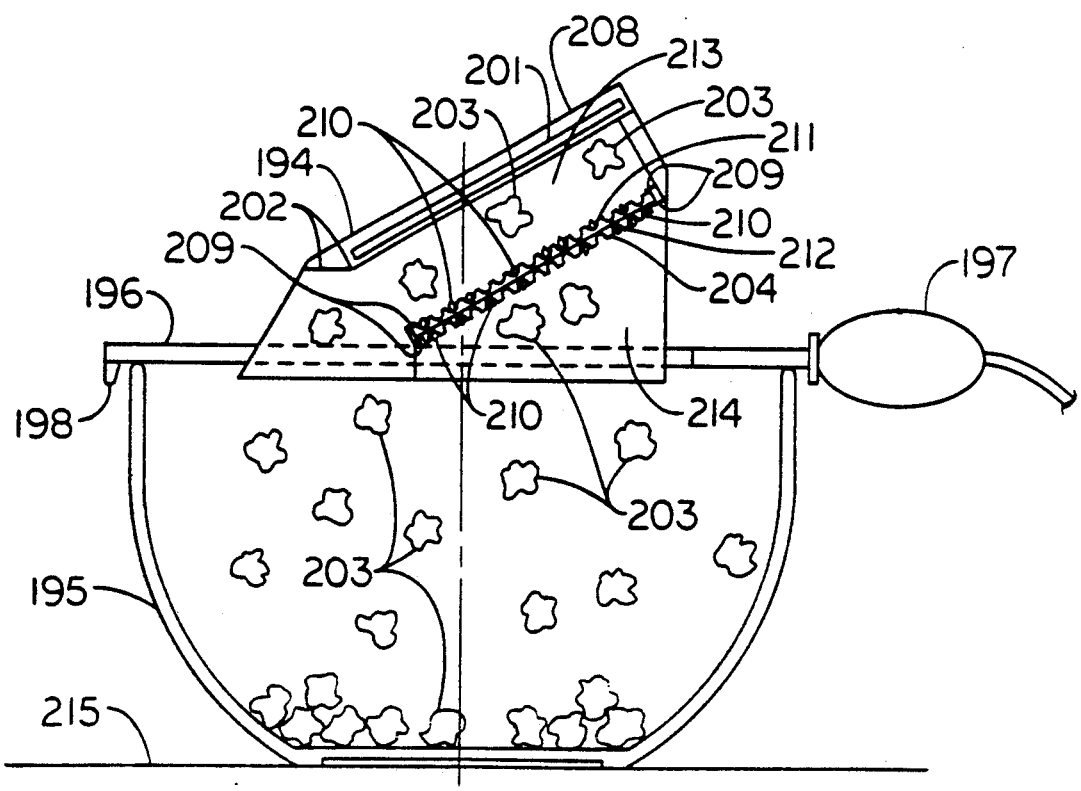
FIG. 62 is a section elevation of a bowl top popper as taken through FIG. 61.

Referring to FIG. 62, there is shown a section elevation of the bowl top popper 194 on top of a bowl 195. The support frame 196 is shown supporting the bowl top popper 194 on the bowl 195 with the stop 198 at one end and the handle 197 at the other end. The bowl 195 is shown on a counter top 215 or some other suitable surface.

The heater 201 is shown enclosed by the top surface 208 and the cover plate 202 to prevent the popped corn 203 from striking the heater 201. The corn cassette 204 is shown held in place by the cassette guides 209 on each side of the corn cassette 204.

The corn cassette 204 shown contains or supports corn kernels 210 on the upper surface 211 and on the lower surface 212 in the same manner as has been described in other FIGURES. The corn kernels 210 that pop from the upper surface 211 pop into the upper chamber 213 of the bowl top popper 194 and the corn kernels that pop into popped corn 203 from the lower surface 212 pop into popped corn 203 from the lower surface 212 pop into and out of the lower chamber 214. Both the upper chamber 213 and the lower chamber 214 contain the popping corn and direct the popped corn 203 into the bowl 195.

Although the systems described in detail supra has been found to be most satisfactory and preferred, many variations in mechanics, structure and method are possible. For example, heating elements could be used instead of microwaves as a source of heating; plastics could be used instead of paper or foil and various other configurations could be used to hold corn kernels.

The above are exemplary of the possible changes or variations because many varying and different embodiments made within the scope of the inventive concept herein taught and because many modifications may be made in the embodiments herein detailed in accordance with the descriptive requirements of law, it should be understood that the details herein are to be interpreted as illustrative and not in a limiting sense.

What is claimed as invention is:

1. A popcorn popping device for popping corn kernels held by a corn kernel cassette, into popped corn comprising;
   a popper, said popper having a block shaped exterior and a hollow oven-like interior, said exterior having at least a first side and a second side and a top side and a bottom side;
   a corn kernel cassette having dimples formed in said corn kernel cassette, said dimples for containing and holding popcorn kernels inside of said corn kernel cassette and further isolate said corn kernels from each other;
   a heating means fixed to said oven-like interior of said popper;
   at least one cassette guide fixed to said interior of said popper;
   a cassette slot cut through said first side of said popper, said cassette slot having a dimension slightly greater than the depth and width of said corn kernel cassette to allow said corn kernel cassette to be inserted into said popper;
   said cassette guides for holding said corn kernel cassette within said popper;
   a mouth cut through one end of said popper for allowing said popped corn to fall out of said popper, said corn kernels are placed into said popper on said corn kernel cassette and are heated by said heating means until said corn kernels pop into said popped corn wherein said popping corn pops out of said dimples without disturbing the unpopped corn and said popped corn falls off of said corn kernel cassette and further falls out of said mouth of said popper wherein the unpopped corn kernels remain in said dimples formed in said cassette.

2. The device of claim 1 wherein said mouth is located above said corn kernel cassette.

3. The device of claim 1 wherein said heating means is in a horizontal plane.

4. The device of claim 1 wherein said heating means is in a vertical plane.

5. The device of claim 1 wherein said mouth is below said corn kernel cassette.

6. The popcorn popping device of claim 1 wherein said popcorn popping device is on a stand.

7. The popcorn popping device of claim 1 wherein said device is supported on a wall mount.

8. The popcorn popping device of claim 1 wherein said popcorn popping device is supported on a below cupboard mount.

9. The popcorn popping device of claim 1 wherein said heater is separated from said popcorn kernel cassette by a screen.

10. A popcorn popping device for popping corn kernels held by a corn kernel cassette into popped corn, comprising;
  a popper, said popper having a block shaped exterior and a hollow oven-like interior, said exterior having at least a first side and a second side and a top side and a bottom side;
  a heating means fixed to said oven-like interior;
  a corn kernel cassette with dimples formed in said corn kernel cassette and wherein one said corn kernel is placed in each said dimple to further isolate said corn kernel from other corn kernels;
  a mouth said mouth is in one side of said popcorn popping device for allowing said popped corn to fall out of said popcorn popping device, wherein said corn kernels are placed into said popcorn popping device in said dimples formed in said corn kernel cassette and are further heated by said heating mans until said isolated corn kernels in said dimples pop into said popped corn and further do not disturb other corn kernels also isolated in said dimples, and wherein said popped corn rolls off of said corn kernel cassette and further falls out of said popcorn popping device and wherein said unpopped corn kernels remain isolated in said dimples formed in said corn kernel cassette.

11. The device of claim 10 wherein said heating means is below said corn kernel cassette.

12. The device of claim 10 wherein said heating means is above said corn kernel cassette.

13. The device of claim 10 wherein said heating means is in a vertical position and is next to said corn kernel cassette.

14. The device of claim 10 wherein said oven-like interior has a sloping popping chamber, said sloping popping chamber to further cause said popped corn to fall and roll in a downward direction.

15. A popcorn popper for popping corn kernels held by a corn kernel cassette into popped corn while said popcorn popper is setting on a bowl, comprising;
  a bow;
  a popper, said popper having a block shaped exterior and a hollow interior;
  a heating means fixed to said hollow interior;
  a corn kernel cassette with dimples formed in said corn kernel cassette and wherein one said corn kernel is placed in each said dimple, to further isolate said corn kernels from other corn kernels;
  a support frame, said support frame to support said popcorn popper across the span of said bowl;
  a popping chamber, said popping chamber to contain said popcorn and further said popping chamber to direct said popped corn into said bowl, said corn kernels are placed into said popper on said corn cassette and are heated by said heating means until said corn kernels pop out of said dimple formed in said corn kernel cassette, and wherein said popped corn does not affect said isolated unpopped corn kernels in adjacent dimples and only said popped corn is directed out of said chamber of said popper and said popped corn further falls into said bowl.

16. The popcorn popper of claim 15 wherein said popper has an upper chamber.

17. The popcorn popper of claim 15 wherein said popper has a lower chamber.

18. The popcorn popper of claim 15 wherein said popper has both an upper chamber and a lower chamber.

19. The popcorn popper of claim 15 wherein said corn cassette contains said corn kernels in the upper surface of said corn cassette and the lower surface of said corn cassette.

20. The popcorn popper of claim 15 wherein said support frame has a stop means to hold said support frame and said popper over said bowl.

21. The popcorn popper of claim 15 wherein said support frame has a handle, said handle to allow said support frame and said popper to be held with at least one hand.

* * * * *